(12) United States Patent  (10) Patent No.: US 7,395,911 B2
Ooishi et al.                  (45) Date of Patent:     Jul. 8, 2008

(54) VEHICLE WITH CLUTCH ASSIST DEVICE

(75) Inventors: Akifumi Ooishi, Shizuoka-ken (JP);
Yousuke Ishida, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 229 days.

(21) Appl. No.: 11/328,417

(22) Filed: Jan. 9, 2006

(65) Prior Publication Data
US 2006/0169569 A1    Aug. 3, 2006

(30) Foreign Application Priority Data
Jan. 7, 2005   (JP) ............................. 2005-002873
Apr. 26, 2005  (JP) ............................. 2005-128070

(51) Int. Cl.
*F16D 19/00*    (2006.01)

(52) U.S. Cl. ...................................... 192/99 S

(58) Field of Classification Search ............. 192/89.29, 192/83, 70.27, 89.24, 99 S, 101, 82 P
See application file for complete search history.

(56) References Cited

U.S. PATENT DOCUMENTS

| | | | | |
|---|---|---|---|---|
| 1,267,999 A | 5/1918 | Fretz | ..................... | 192/89.26 |
| 2,111,281 A | 3/1938 | Dodge | ..................... | 192/99 S |
| 3,187,867 A | 6/1965 | Sink | ..................... | 192/89.26 |
| 3,199,366 A | 8/1965 | Herrington, Jr. | ........... | 74/512 |
| 3,261,438 A | 7/1966 | Binder | ..................... | 192/99 S |
| 3,302,763 A | 2/1967 | Wobrock | ..................... | 192/89.2 |
| 4,393,907 A | 7/1983 | Kronstadt | ............... | 192/99 S |
| 4,624,152 A | 11/1986 | Stotz et al. | ............... | 74/518 |
| 4,655,332 A | 4/1987 | Herbulot et al. | ......... | 192/70.28 |
| 5,044,223 A | 9/1991 | Mizuma et al. | ........... | 74/512 |
| 5,495,928 A | 3/1996 | Sando | | |
| 6,050,379 A | 4/2000 | Lyon | ..................... | 192/54.1 |
| 7,168,543 B2* | 1/2007 | Oishi et al. | ............... | 192/99 S |
| 7,178,655 B2* | 2/2007 | Oishi et al. | ............... | 192/99 S |
| 2005/0011719 A1 | 1/2005 | Oishi et al. | ............... | 192/99 S |
| 2005/0072648 A1 | 4/2005 | Peppard et al. | ........... | 192/99 R |
| 2005/0252748 A1 | 11/2005 | Oishi et al. | ............... | 192/99 S |
| 2006/0169561 A1* | 8/2006 | Ooishi et al. | ............. | 192/70.27 |
| 2007/0205072 A1 | 9/2007 | Villata et al. | ............. | 192/85 C |

OTHER PUBLICATIONS

USPTO Office Action dated Nov. 5, 2007, U.S. Appl. No. 11/328,714 in 12 pages.

* cited by examiner

*Primary Examiner*—Dirk Wright
(74) *Attorney, Agent, or Firm*—Knobbe Martens Olson & Bear LLP

(57) ABSTRACT

A compact clutch assist device has an assist mechanism operating between a clutch operating lever and a transmission clutch. The clutch assist device is interposed between a first clutch wire connected to the clutch operating lever and a second clutch wire connected to the transmission clutch. The clutch assist device selectively urges the clutch wires in such a direction as to assist disengaging the transmission clutch. The clutch assist mechanism has a case and a rotatable member that is housed in the case. The rotatable member receives an urging force of an auxiliary force member. In one embodiment, the auxiliary force member is coupled to the rotatable member through a cam mechanism.

21 Claims, 35 Drawing Sheets

VEHICLE WITH CLUTCH ASSIST DEVICE

CROSS-REFERENCE TO RELATED APPLICATIONS

This application is based on and claims priority under 35 U.S.C. § 119(a)-(d) to Japanese Patent Application No. 2005-128070, filed Apr. 26, 2005, and to Japanese Patent Application No. 2005-002873, filed Jan. 7, 2005, the entire contents of which are hereby incorporated by reference.

BACKGROUND OF THE INVENTION

1. Field of the Invention

The present invention relates to a clutch assist device which can reduce the force necessary to operate a friction clutch to engage and disengage a transmission of a vehicle.

2. Description of the Related Art

An engine unit of a vehicle, for example a motorcycle, is often equipped with a friction clutch that operates to engage and disengage a transmission. With the clutch engages, the transmission transfers torque from the engine crankshaft to one or more wheels of the motorcycle and, with the clutch disengaged, the transmission is decoupled from the engine so as not transfer a driving torque to the wheel(s). The friction clutch typically has friction plates and clutch plates laid alternately next to one another. A clutch spring presses the friction plates against the clutch plates and biases the friction plates into this state so as to transmit torque.

The clutch has a clutch release mechanism. The clutch release mechanism, which is used to release the pressure against the friction plates caused by the clutch spring, is coupled to a clutch operating lever via a clutch wire. A Bowden-wire cable is often used as the clutch wire and includes an inner wire that slides relative to an outer sheath. The clutch operating lever is usually disposed on the handlebars of the motorcycle. When the rider squeezes the clutch operating lever, the friction plates are separated from the clutch plates, against the urging force of the clutch spring, to disengage the clutch and, hence, the transmission from the engine.

With a friction clutch used in a high-power, high-revolution engine, it is desired to set the biasing load of the clutch spring to a high value to increase the torque capacity of the clutch. However, since the clutch operating lever is operated manually, it often is difficult for at least some riders to operate the clutch operating lever when the biasing load of the clutch spring is increased.

A clutch assist mechanism has been previously proposed to reduce the force necessary to actuate the clutch operating lever. See U.S. Pat. No. 5,495,928. The clutch assist device disclosed in the '928 patent is installed at an intermediate point of a clutch wire that connects a clutch operating lever and a clutch lever of a friction clutch.

The clutch assist mechanism of the '928 patent has an elongated frame secured to the vehicle body. The frame has wire through holes at its longitudinal ends through which the inner wire of the clutch wire extends. The frame has openings on both sides thereof.

A pair of plate springs is attached to the frame. The base ends of the plate springs are secured to the sides of a first end of the frame. The distal ends of the plate springs protrude from the first end of the frame and face the openings of the frame. The clutch assist mechanism also has a pair of linking rods and a clamp bracket. The clamp bracket is secured to the wire extending through the frame and is movable together with the wire. Each linking rod has one end connected to the clamp bracket and the other end connected to the distal end of its corresponding plate spring.

In the operation clutch assist mechanism, when the clutch operating lever is squeezed to disengage the friction clutch, the clamp bracket is pulled toward the first end of the frame, which causes the linking rods to tilt and the plate springs to deform. Then, when the linking rods pass the point where they are perpendicular to the longitudinal direction of the frame, the resultant of the restoring forces of the plate springs acts in the same direction as the direction in which the inner wire is pulled by the clutch operating lever, and the clamp bracket is urged together with the inner wire. As a result, the urging force acts to assist the clutch operating lever to spread the friction plates from the clutch plates against the bias of the clutch spring. Consequently, the manual force required to operate the clutch is reduced.

While the clutch assist mechanism disclosed in the '928 patents reduces the manual force required to operate the clutch operating lever, the mechanism is necessarily long and, thus, requires a frame having a long linear portion. The long length of the clutch assist mechanism is dictated by its structure: the clamp bracket must move in the frame from one end toward the other to generate an assist force. Accordingly, it is difficult to reduce the size of the mechanism, which in turn limits design options for the vehicle (e.g., the motorcycle) on which it is used.

Also, because a long frame must be disposed at an intermediate point of the clutch wire, a relatively long linear space must be additionally formed at an intermediate part of the clutch wire. As a result, another section or sections of the clutch wire must be curved into an arc with a large radius of curvature to transition from a generally vertical orientation to a generally horizontal orientation as the wire is routed from the clutch operating lever (which usually resides on the handlebars) to the clutch (which usually resides near or below the engine and remote to the handlebars).

In general, when the clutch wire is curved sharply, the inner wire rubs against the outer sheath at the curve and a large sliding resistance is applied to the inner wire when the clutch lever is operated. Such friction increases the operating force required to disengage the clutch. Thus, the assisting function of the clutch assist mechanism is reduced or canceled. Consequently, the some riders may find the clutch operating lever hard to actuate.

A need therefore exists for a compact clutch assist device that assists the operation of a clutch lever and that can be easily mounted on a vehicle with improved convenience.

SUMMARY OF THE INVENTION

One aspect of the present invention involves a clutch assist device operating between a clutch and a clutch operator. The clutch and clutch operator are connected together by a transmitter having first and second linear members. The clutch includes a clutch element that is biased by a clutch spring toward an engaged position and is movable by the clutch operator and the transmitter from the engaged position to a disengaged position. The clutch assist device operates between the first and second linear members and comprises a rotatable member and an auxiliary force member. The rotatable member is to the first and second linear members and is rotatable about a rotational axis. The auxiliary force member is disposed relative to the rotatable member so as to apply an assist force to the rotatable member in such a direction as to assist disengaging the clutch element while the clutch operator is moved from a disengage start position, at which point the clutch operator works against the bias of the clutch spring, to a disengaged position where the clutch element is in the disengaged position.

The first and second linear members preferably are guided by the rotation of the rotatable member. Therefore, there is no need for a frame elongated in one direction and the device can be small in size. Also, there is no need to form a relatively long linear space at an intermediate portion of the transmitter. Accordingly, the transmitter, such as, for example, a clutch wire, does not have to be sharply curved. The clutch assist device consequently can be made compact and can ease mounting of the clutch assist device to the vehicle.

Also, the direction in which the clutch wire or the like is curved can be guided. Therefore, in the case where the clutch wire or the like has to be curved sharply at a mid-portion because of limitations in installing the clutch wire or like design limitations, the use of the rotatable member permits the first and second sections of the wire to lie skewed relative to each other. Consequently, the clutch assist device can provide a compact coupling between the clutch wires which permits a sharp turn in the transmitter. Accordingly, the clutch wire or like transmitter can be moved smoothly and the assist force of the auxiliary force member is not reduced. Therefore, since the clutch operator (e.g., clutch operating lever) can be easily operated with a small force to disengage the friction clutch, the operability of the clutch operator can be improved.

BRIEF DESCRIPTION OF THE DRAWINGS

These and other features, aspects, and advantages of the present invention will now be described in connection with preferred embodiments of the invention, with reference to the accompanying drawings. The illustrated embodiments, however, are merely examples and are not intended to limit the invention. The drawings include the following thirty-five figures.

FIG. 4 illustrates a state of the clutch assist device at the time when a clutch operating lever is fully released.

DETAILED DESCRIPTION OF THE PREFERRED EMBODIMENT

The following describes two examples of embodiments that the present clutch assist device can take with reference to the drawings. In the following embodiments, a clutch operating device and a clutch assist device, which are configured in accordance with aspects of the present invention, are applied to a motorcycle. The clutch operating device and the clutch assist device, however, are applicable to other types of vehicles, including other types of straddle-type vehicles, including, without limitation, to scooters, ATVs, snowmobiles and the like.

For the purpose of describing the embodiments below, several terms of orientations are used to describe the motorcycle, the clutch assist device, and the components of the motorcycle with which the clutch assist device operates. Terms such as, for example, "up," "down," "left," "right," "vertical," "horizontal," "higher," "upper," "lower," "back" are used from the perspective of the motorcycle orientation shown in FIG. 1 and in manner consistent with the ordinary meaning of these terms; however, the clutch assist device and the associated components of the motorcycle can assume different orientations than those illustrated in the embodiments. Hence, it is not intended that such terms of orientation limit the invention.

First Embodiment

Figure 1:
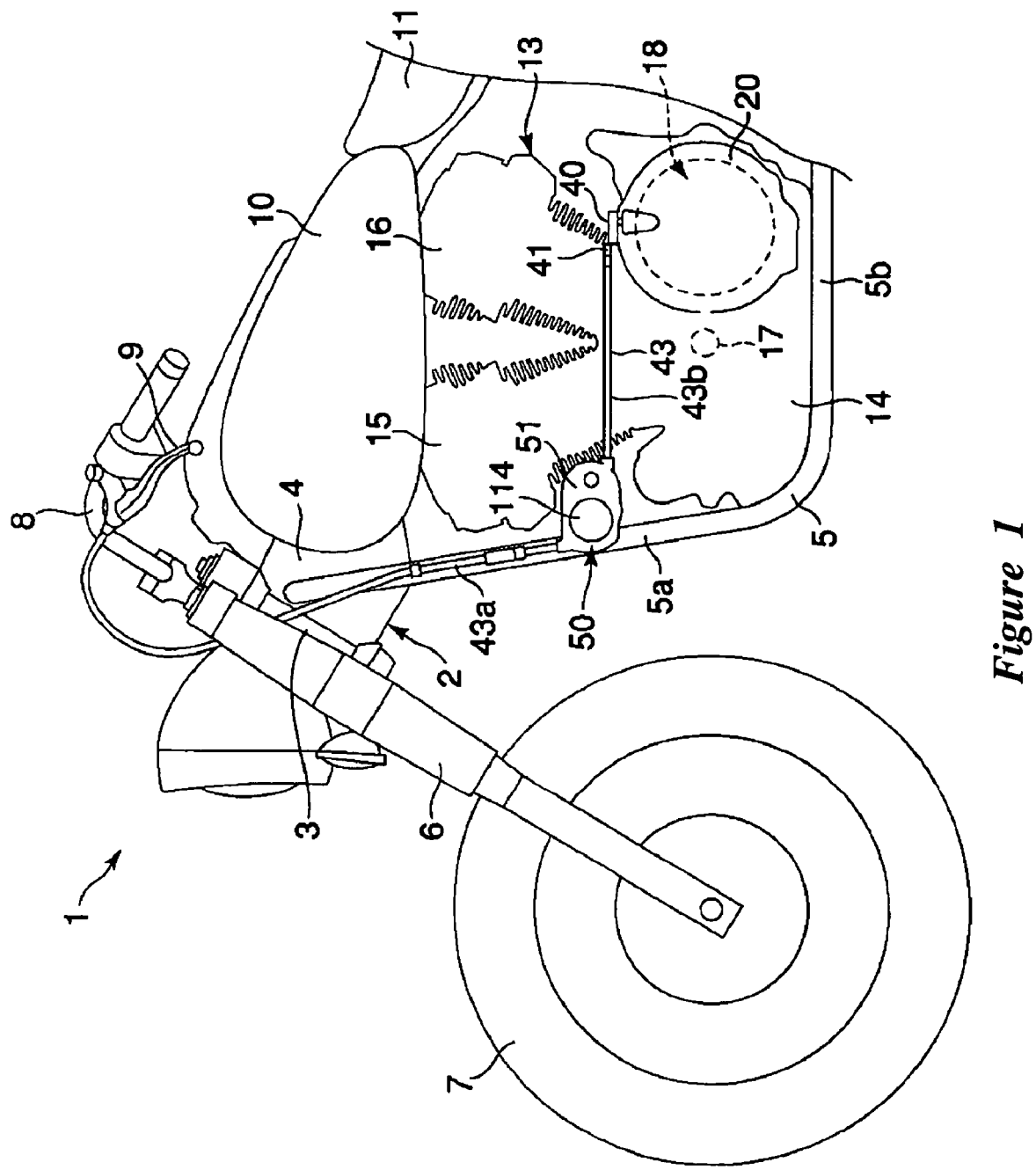
FIG. 1 is a partial side view of a motorcycle including a clutch assist device configured in accordance with an embodiment of the present invention. The motorcycle is shown in an upright position on a generally flat surface.
Figure 2:
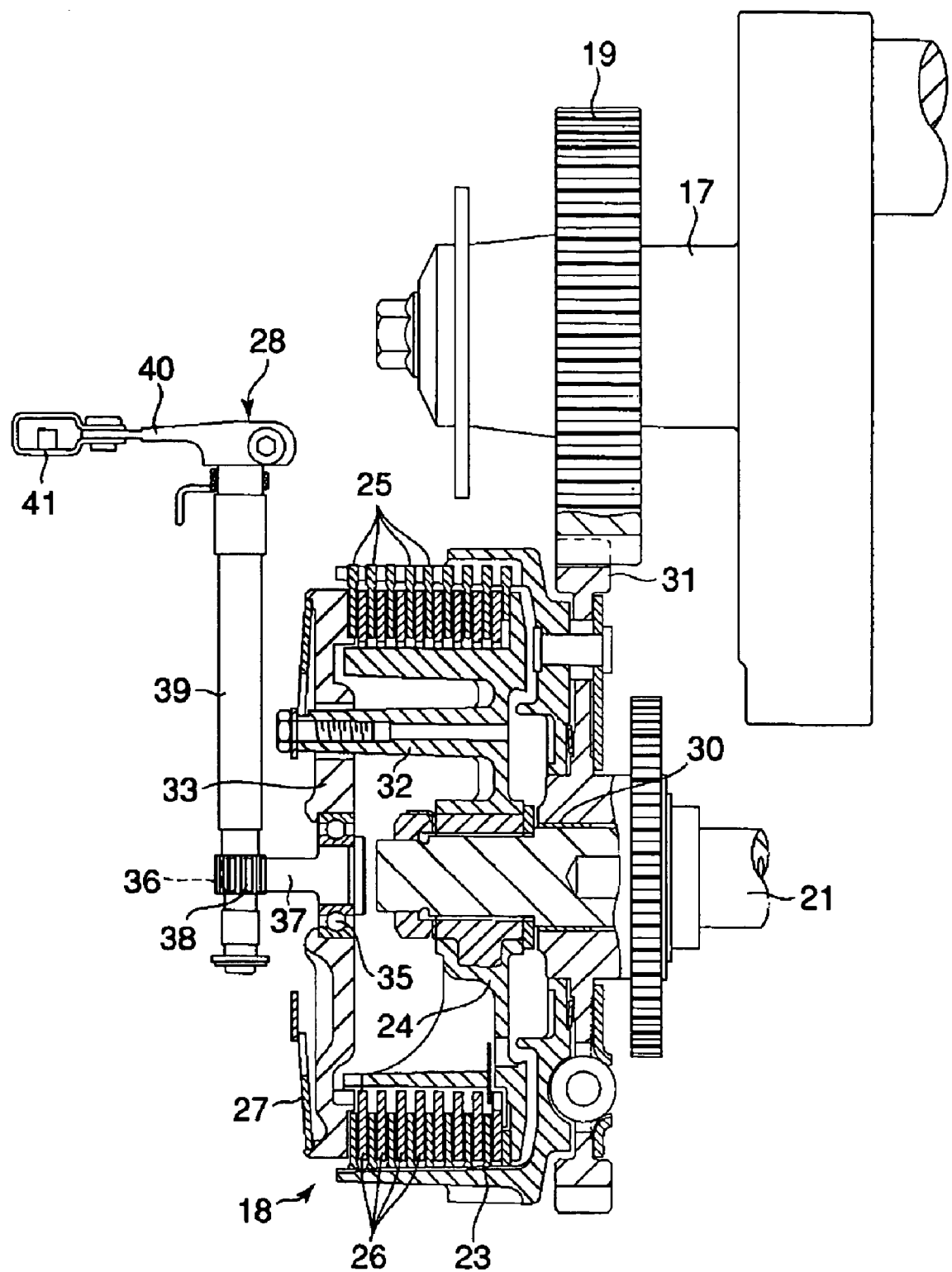
FIG. 2 is a cross-sectional view of an example of a friction clutch that can be used with the embodiments of the clutch assist device and with the motorcycle illustrated in FIG. 1.

With initial reference to FIGS. 1 and 2, a motorcycle, which includes the present clutch assist device, has a frame 2. The frame 2 includes a steering head pipe 3, a main frame member 4 and a down tube 5. The steering head pipe 3 supports a front fork 6. To the upper end of the front fork 6 is secured a handlebar 8 for steering a front wheel 7. A clutch lever 9 is attached to the left end of the handlebar 8. The clutch lever 9 is one example of the type of clutch operator with which the present clutch assist device can be used. While the clutch operator is manually operated by hand in this embodiment, the clutch operator can be operated by foot or otherwise by the vehicle's rider.

The main frame member 4 extends backward from the steering head pipe 3. The main frame member 4 supports a fuel tank 10 and a seat 11. The down tube 5 has a first portion 5a extending downward from the front end of the main frame member 4 and a second portion 5b extending backward from the lower end of the first portion 5a.

The frame 2 supports an engine, preferably a V-twin cylinder engine 13. In the illustrated embodiment, the engine 13 has a crankcase 14, a front cylinder 15 and a rear cylinder 16. The front cylinder 15 and the rear cylinder 16 protrude from an upper surface of the crankcase 14 toward the fuel tank 10 above the crankcase 14.

The down tube 5 of the frame 2 preferably holds the engine 13. The first portion 5a of the down tube 5 extends vertically, directly in front of the engine 13, and the second portion 5b of the down tube 5 extends longitudinally under the crankcase 14.

As shown in FIGS. 1 and 2, the crankcase 14 preferably houses a crankshaft 17 and a wet multi-plate friction clutch 18. The crankshaft 17 is disposed horizontally in the vehicle width direction, and a speed reduction small gear 19 is secured to the left end of the crankshaft 17. The friction clutch 18 is located behind the speed reduction small gear 19 and at the left end in the crankcase 14. The friction clutch 18 is covered with a clutch cover 20 attached to the left side of the crankcase 14.

The friction clutch 18 is used to engage or disengage the transmission of torque from the crankshaft 17 to an input shaft 21 of a transmission and is manually operated when the rider squeezes the clutch lever 9 with a hand. As shown in FIG. 2, the friction clutch 18 has a clutch housing 23, a clutch boss 24, a plurality of friction plates 25, a plurality of clutch plates 26, a clutch spring 27 and a clutch release mechanism 28.

The clutch housing 23 is rotatably supported on the left end of the input shaft 21 via a bearing 30. A speed reduction large gear 31 is coaxially connected to an end of the clutch housing 23. The speed reduction large gear 31 meshes with the speed reduction small gear 19. This engagement allows the torque from the crankshaft 17 to be transmitted to the clutch housing 23.

The clutch boss 24 is secured to the left end of the input shaft 21 so as to rotate with the input shaft 21. The clutch boss 24 is surrounded by the clutch housing 23 and has a plurality of boss parts 32 (only one of which is shown in FIG. 2) protruding toward the clutch cover 20.

The friction plates 25 are supported on the outer periphery of the clutch housing 23. The friction plates 25 are rotatable together with the clutch housing 23 and are arranged coaxially in the axial direction of the input shaft 21 with intervals therebetween.

The clutch plates 26 are supported on the outer periphery of the clutch boss 24. The clutch plates 26 are rotatable together with the clutch boss 24, and each of the clutch plates 26 extends between adjacent friction plates 25. Therefore, the friction plates 25 and the clutch plates 26 are arranged alternately in the clutch housing 23.

In this embodiment, a diaphragm spring is used as the clutch spring 27. The clutch spring 27 is located on the left side of the clutch housing 23 and the clutch boss 24 and supported on the ends of the boss parts 32. The clutch spring 27 constantly presses the friction plates 25 against the clutch plates 26 via a pressure plate 33. A frictional force is thereby generated between the friction plates 25 and the clutch plates 26 and maintains the frictional clutch 18 in an engaged state capable of transmitting torque.

The clutch release mechanism 28 is used to release the pressure on the friction plates 25 caused by the clutch spring 27. In this embodiment, the clutch release mechanism 28 is a rack and pinion type. The clutch release mechanism 28 has a push rod 37 having a rack 36, and a push lever shaft 39 having a pinion 38.

The push rod 37 is rotatably supported at the center of the pressure plate 33 by a bearing 35 and is located coaxially with the input shaft 21. The push rod 37 is also supported by a clutch cover 20 for sliding movement in directions toward and away from the input shaft 21.

The push lever shaft 39 is rotatably supported by the clutch cover 20. The push lever shaft 39 extends in a vertical direction and perpendicular to the push rod 37, and the pinion 38 of the push lever shaft 39 meshes with the rack 36 of the push rod 37. The upper end of the push lever shaft 39 protrudes upward from the clutch cover 20. One end of a push lever 40 is secured to the upper end of the push lever shaft 39. The push lever 40 extends horizontally from the upper end of the push lever shaft 39 and has a wire connecting part 41 at its other end.

The wire connecting part 41 of the push lever 40 is connected to the clutch lever 9 via a clutch wire 43 (see FIG. 1). When the rider squeezes the clutch lever 9 with a hand, the other end of the push lever 40 is pulled via the clutch wire 43 to rotate the push lever shaft 39. The rotation of the push lever shaft 39 is converted to linear motion through the meshing of the pinion 38 with the rack 36. Therefore, the pressure plate 33 is slid in a direction away from the friction plates 25 against the biasing force of the clutch spring 27 to release the pressure contact between the friction plates 25 and the clutch plates 26. As a result, the friction clutch 18 is shifted to a disengaged state in which the transmission of torque is ceased. The push lever shaft 39, the push lever 40, the clutch wire 43 and so on constitute a transmitter for transmitting the operating force applied to the clutch lever 9 to the frictional clutch 18.

Therefore, the clutch lever 9 is rotatable between a return or fully released position where the friction clutch 18 is maintained in the engaged state and a disengaged position where the frictional clutch 18 is in the disengaged state. Since the clutch lever 9 has some degree of free play (for example, 10 to 15 mm from the return position as measured at the end of the clutch lever 9), the engaged state is maintained even when the clutch lever 9 is squeezed within this range. The clutch wire 43 is pulled only slightly and the urging force of the clutch spring 27 is not transmitted to the clutch lever 9 when the clutch lever 9 is operated within this free play range. The position where the free play of the clutch lever 9 ends is a disengage start position (see FIG. 15). When the clutch lever 9 is in the disengage start position, the biasing force of the clutch spring 27 acts on the clutch lever 9 via the clutch wire 43.

Figure 15:
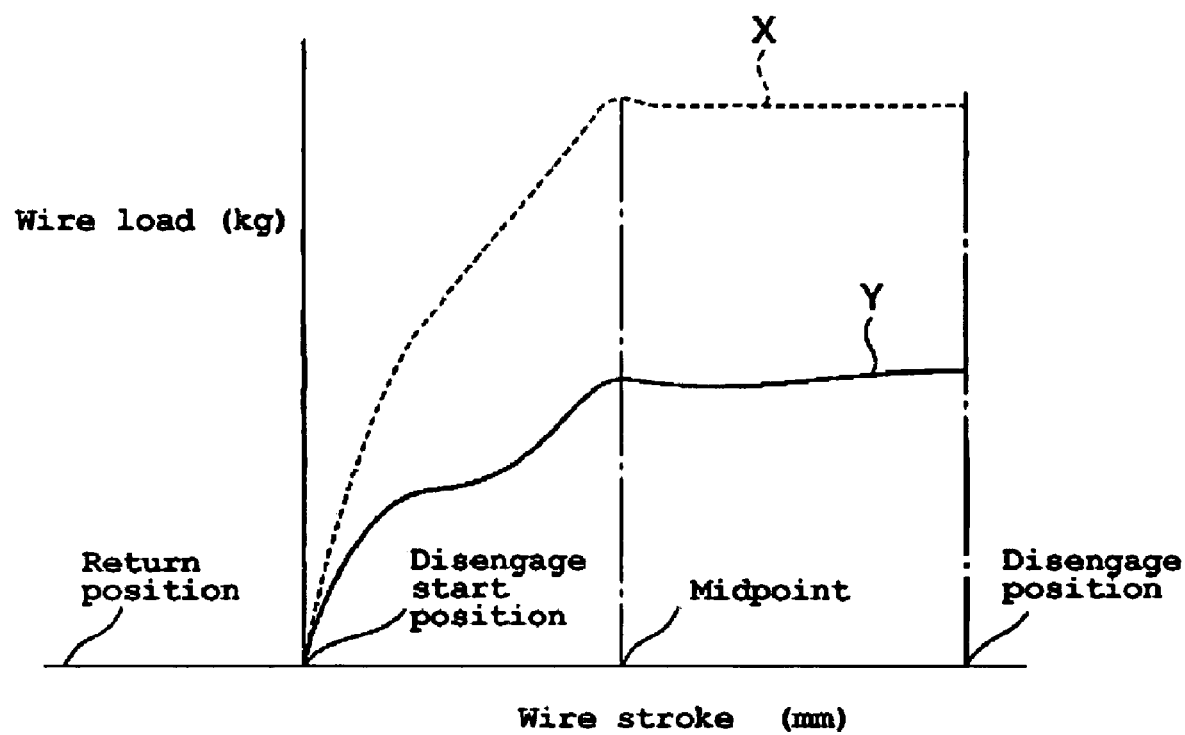
FIG. 15 is a graph showing the changes of the loads applied to a clutch push lever and a clutch operating lever, as a result of the clutch assist device of the first embodiment, when the clutch operating lever is moved to disengage the friction clutch.

FIG. 15 shows the relation between the stroke amount of the clutch wire 43 and the wire load at the time when the clutch lever 9 is moved from the fully released position to the disengaged position. In FIG. 15, curve X shows the change of the load applied to the push lever 40 via the clutch spring 27.

As can be understood from curve X, when the clutch lever 9 reaches the disengage start position from the return position, a load (reactive force) is applied to the push lever 40 by the clutch spring 27. The load rapidly increases with the increase in the stroke amount of the clutch wire 43, and keeps a generally constant value after the clutch lever 9 has passed the midpoint between the disengage start position and the disengaged position. In this embodiment, the point where the load applied to the push lever 40 becomes generally constant is the midpoint between the disengage start position and the disengaged position. However, the point where the load becomes generally constant may be a point between the disengage start position and the disengaged position other than the midpoint depending on the setting conditions of the push lever 40, the type of the friction clutch 18, etc. The point where the load becomes generally constant is not limited to the midpoint. The load applied to the push lever 40 is transmitted to the clutch lever 9 via the clutch wire 43. Therefore, when the biasing load of the clutch spring 27 is set to a high value to increase the torque capacity of the friction clutch 18, the clutch lever 9 will be stiff to operate.

In this embodiment, a clutch assist device 50 is installed at an intermediate point of the clutch wire 43 to reduce the manual load required to operate the clutch lever 9. As shown in FIG. 1, the clutch wire 43 extending from the clutch lever 9 is curved downward in front of the handlebar 8 and extends along the left side of the engine 13 to the friction clutch 18 disposed on a rear side of the engine 13. The clutch wire 43 consequently curves in such a manner that its direction is largely changed on the left side of the engine 13, and the clutch assist device 50 preferably is located where the clutch wire 43 is curved.

The clutch wire 43 has a first clutch wire 43a connected to the clutch lever 9 and a second clutch wire 43b connected to the push lever 40, and the first clutch wire 43a and the second clutch wire 43b are connected to each other via the clutch assist device 50. The first clutch wire 43a extends between the clutch lever 9 and the clutch assist device 50. The second clutch wire 43b extends between the push lever 40 of the clutch release mechanism 28 and the clutch assist device 50.

Figure 4:
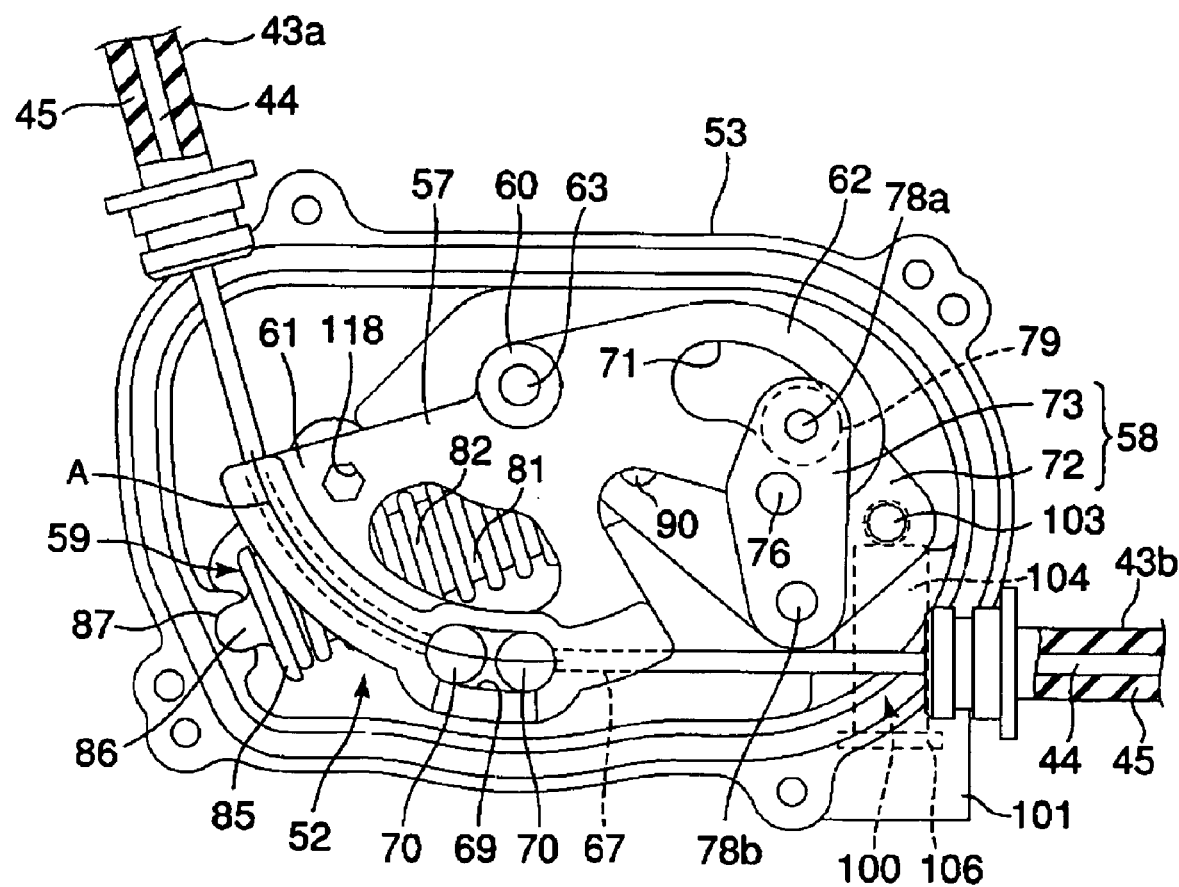
FIG. 4 is a side view of the clutch assist device of FIG. 3 with one side of the device's housing removed to illustrate the internal components the device.

As shown in FIG. 4, each of the first clutch wire 43a and the second clutch wire 43b preferably has a metal inner wire and a synthetic resin outer tube or sheath 45 surrounding the inner wire 44. The inner wires 44 are slidably in contact with the outer tubes 45, and the both ends of the inner wires 44 protrude from both ends of the outer tubes 45.

As shown in FIG. 3 to FIG. 7, the clutch assist device 50 has an exterior case 51 and an assist mechanism 52 housed in the exterior case 51. The exterior case 51 preferably is made of a metal material such as an aluminum alloy. The outer surfaces of the exterior case 51 can be plated to improve the appearance of the exterior case 51. The outer surfaces of the exterior case 51 may alternatively be painted.

The exterior case 51 has a case body 53 and a case cover 54. The case body 53 has a dish-like shape opening toward the left of the engine 13 and is supported on the first portion 5a of the down tube 5 via a bracket (not shown). The case cover 54 is fixed to the case body 53 by a plurality of bolts 55 and covers the open end of the case body 53. The exterior case 51 is positioned at generally the same height as the push lever 40 when the motorcycle 1 is viewed from its left side.

Figure 3:
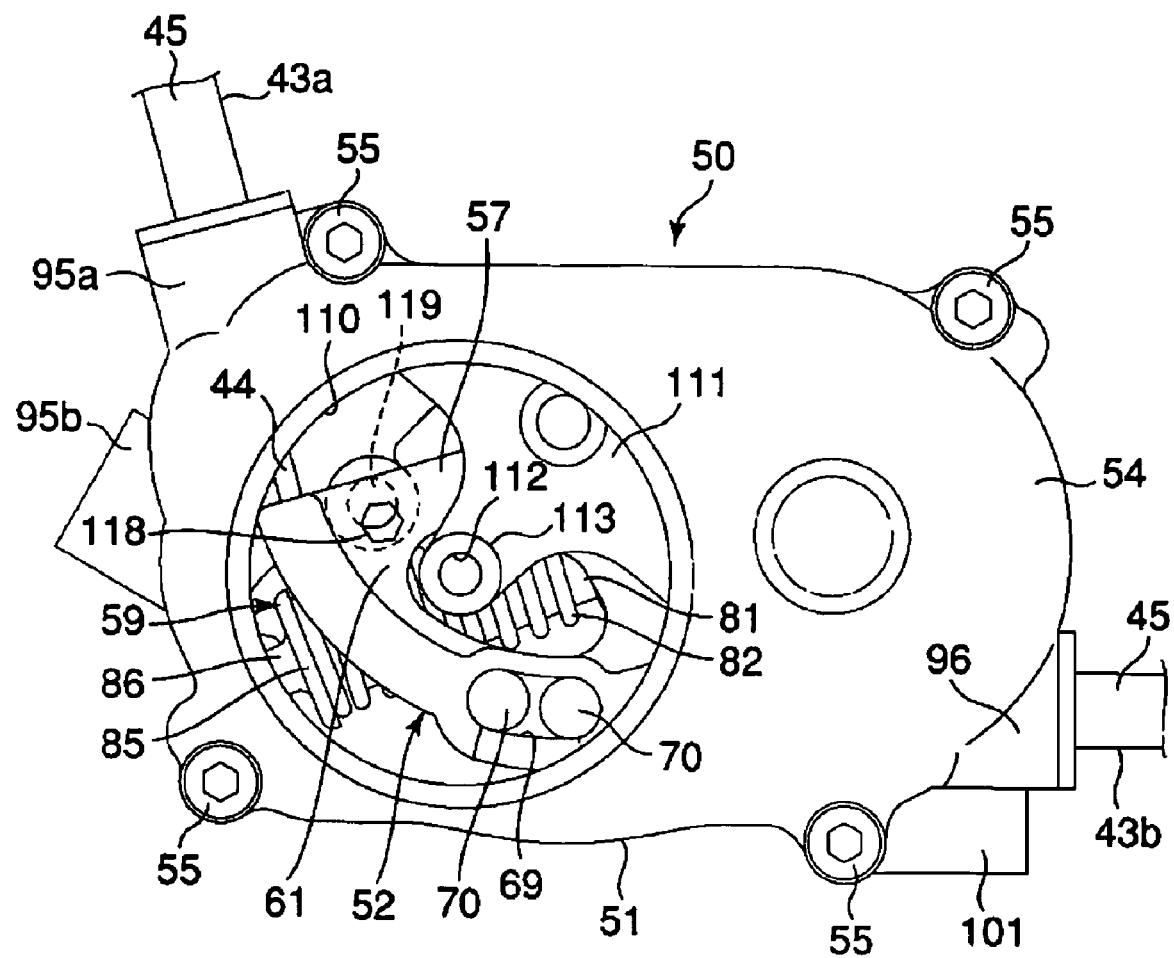
FIG. 3 is a side view of a first embodiment of the clutch assist device that can be used with the motorcycle shown in FIG. 1. A side cover of the clutch assist device is removed to expose some of the inner working of the device.
Figure 7:
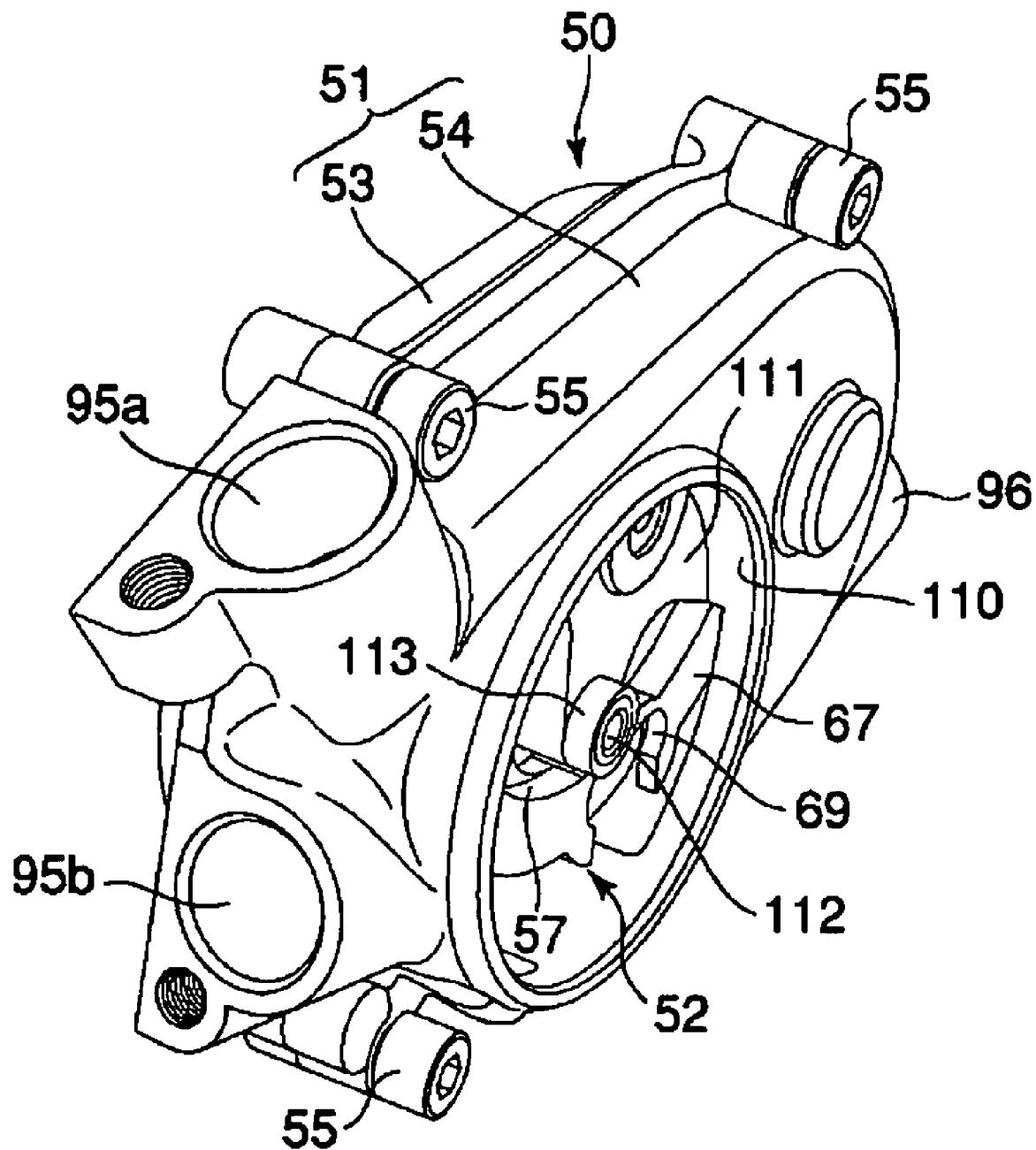
FIG. 7 is a perspective view of the clutch assist device of FIG. 3.
Figure 8:
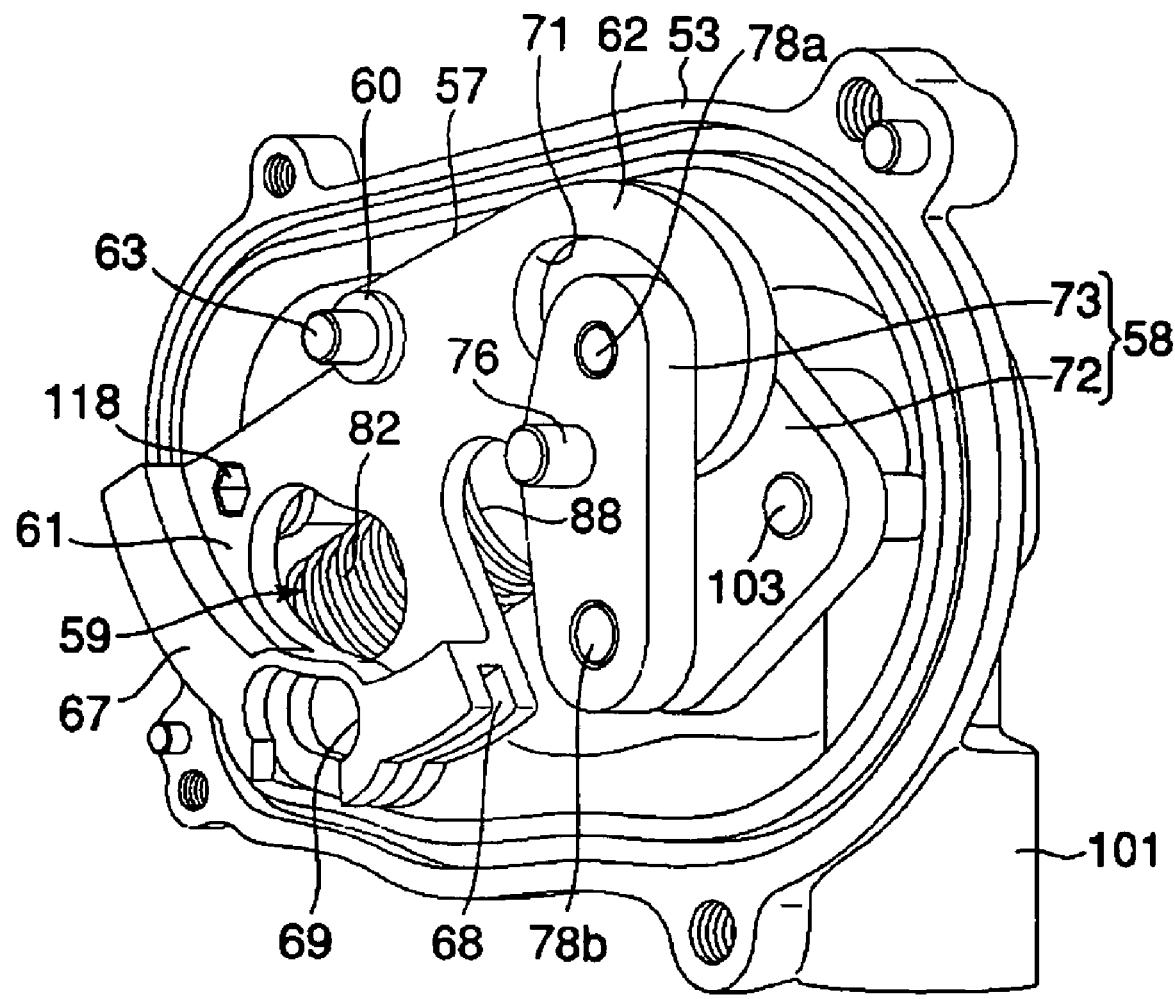
FIG. 8 is a perspective view of a portion of a housing body in which the mechanism of the clutch assist device has been incorporated in the first embodiment.

As shown in FIG. 3 and FIG. 7, the case cover 54 has a pair of first wire introduction ports 95a, 95b as first guide parts. The case cover 54 also has a second wire introduction port 96 as a second guide part. The first and second introduction ports 95a, 95b, 96 open into the case 51. The first wire introduction port 95a protrudes upward from an upper part of the front end the case cover 54. The other first wire introduction port 95b protrudes obliquely upward from an intermediate part of the front end of the case cover 54. The second wire introduction port 96 protrudes backward from a lower part of the rear side of the case cover 54.

In this embodiment, the first clutch wire 43a is inserted into the first wire introduction port 95a. The inner wire 44 of the first clutch wire 43a extends into the exterior case 51 and is connected to a first rotatable member 57. The first clutch wire 43a extends upward along the first portion 5a of the down tube 5 from a front end of the exterior case 51 (see FIG. 1).

The first wire introduction port 95b is used to change the direction in which the clutch wire 43a extends from the exterior case 51. The first wire introduction port 95b is preferably closed by a dust-proof cap (not shown) to prevent entrance of dust or foreign objects into the exterior case 51 when it is not used.

The second clutch wire 43b is inserted into the second wire introduction port 96. The inner wire 44 of the second clutch wire 43b extends into the exterior case 51 and also is connected to the first rotatable member 57. The second clutch wire 43b extends backward from a rear end of the exterior case 51 along the left side of the engine 13 and linearly connects the first rotatable member 57 of the assist mechanism 52 and the push lever 40 (see FIG. 1). Therefore, the first clutch wire 43a and the second clutch wire 43b extend in different directions from the assist mechanism 52.

As shown in FIG. 4 to FIG. 9, the assist mechanism 52 in the present embodiment includes the first rotatable member 57, a second rotatable member 58 and a spring unit 59. The first rotatable member 57 preferably is formed of metal by stamping, for example. The first rotatable member 57 has a pivot part 60, a wire connecting part 61 and a lever part 62.

Figure 6:
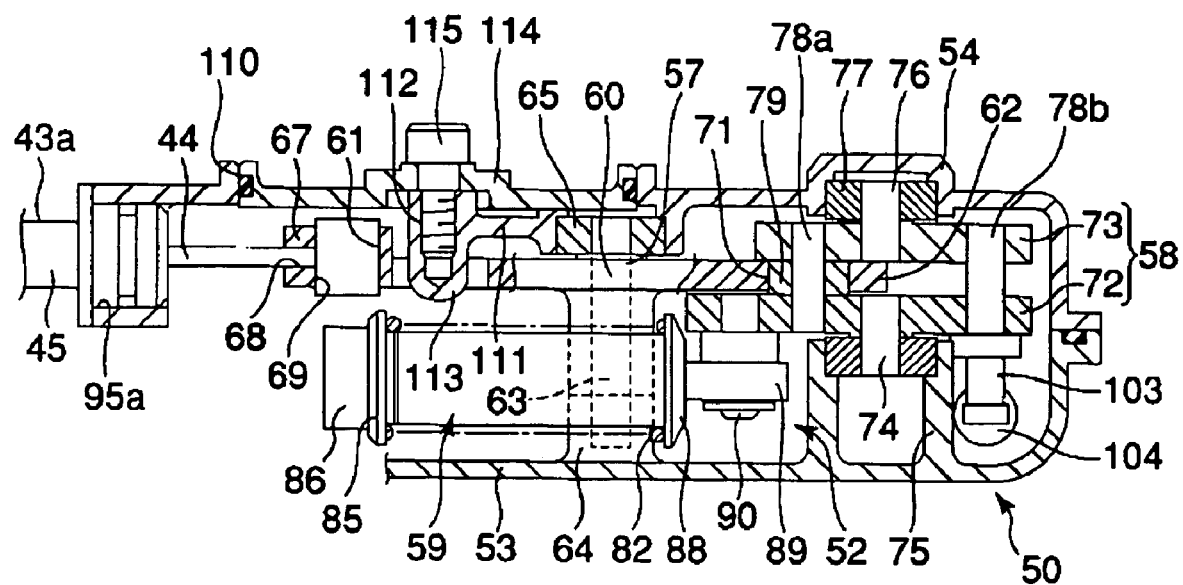
FIG. 6 is a cross-sectional view of the clutch assist device of FIG. 3.
Figure 9:
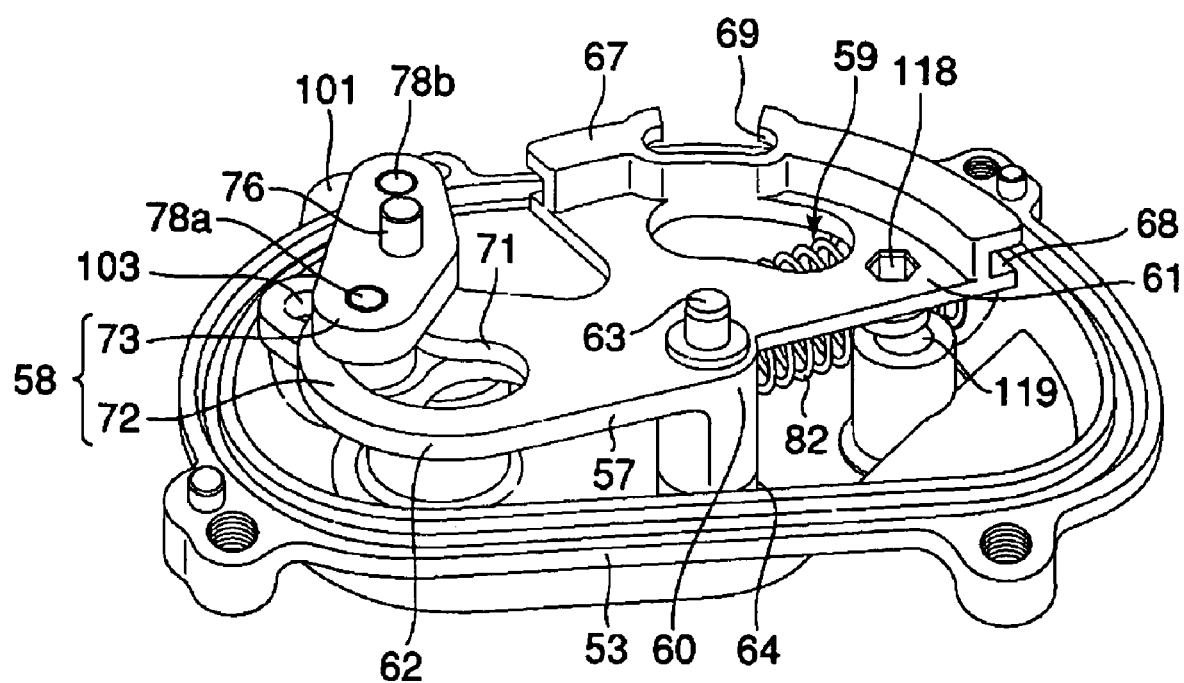
FIG. 9 is another perspective view, from a view generally opposite that of FIG. 8, of the portion of the housing body and mechanism of the first embodiment of the clutch assist device.

In the illustrated embodiment, the pivot part 60 is located between the wire connecting part 61 and the lever part 62, and is rotatably supported by a boss part 64 of the case body 53 via a first pivot shaft 63 (see FIG. 6 and FIG. 9). The end of the first pivot shaft 63 opposite the boss part 64 is supported by a bearing part 65 of the case cover 54.

As shown in FIG. 4, the wire connecting part 61 of the first rotatable member 57 is located in the front half space (in the left half in FIG. 4) in the case body 53. The wire connecting part 61 has a lower edge 67. The lower edge 67 is curved in an arc around the first pivot shaft 63. In other words, the lower edge 67 of the first rotatable member 57 is curved along an arcuate curve A connecting the first wire introduction port 95a and the second wire introduction port 96 when the exterior case 51 is viewed from the left side. Therefore, the lower edge 67 of the wire connecting part 61 rotates along the curve A.

The lower edge 67 of the wire connecting part 61 has an engaging groove 68 (see FIG. 8) and an engaging hole 69. The engaging groove 68 receives the inner wire 44 of the first clutch wire 43a and the inner wire 44 of the second clutch wire 43b and opens in the outer peripheral surface of the edge 67. The engaging hole 69 is a slot elongated along the circumferential direction of the lower edge 67. The engaging hole 69 opens in the outer peripheral surface of the lower edge 67 and in the engaging groove 68. Engaging elements 70 having a cylindrical column shape and secured to ends of the inner wires 44 are engaged with the opening edge of the engaging hole 69.

Therefore, the inner wire 44 of the first clutch wire 43a and the inner wire 44 of the second clutch wire 43b are integrally connected to each other via the first rotatable member 57. The connection causes the inner wire 44 of the first clutch wire 43a and the inner wire 44 of the second clutch wire 43b to move in the exterior case 51 along the curve A which the lower edge 67 of the first rotatable member 57 defines. The inner wires 44 of the first and second clutch wires 43a and 43b preferably move through the same distance.

The lever part 62 is located on the rear side in the rear half space in the case body 53. The lever part 62 has a cam groove 71. As shown in FIG. 4, the cam groove 71 is an arcuate slot and curved in a direction opposite that of the lower edge 67 of the wire connecting part 61.

The second rotatable member 58 has a link plate 72 and a link lever 73. The link plate 72 and the link lever 73 preferably are each formed of metal, by a stamping process for example, and are disposed parallel to each other with the lever part 62 of the first rotatable member 57 interposed therebetween. The link plate 72 is rotatably supported by a boss part 75 of the case body 53 (see FIG. 6) via a second pivot shaft 74 (see FIG. 5). The link lever 73 is rotatably supported by a bearing part 77 of the case cover 54 via a third pivot shaft 76 (see FIG. 4). The second pivot shaft 74 and the third pivot shaft 76 are disposed coaxially with each other.

The link plate 72 and the link lever 73 are integrally joined to each other via first and second pins 78a and 78b. The first pin 78a extends through the cam groove 71 of the first rotatable member 57. A cam follower 79, such as a roller, is rotatably supported by the first pin 78a. The cam follower 79 is located in the cam groove 71 and in contact with the inner surface of the cam groove 71.

Therefore, the cam groove 71 and the cam follower 79 can transmit the motion of the first rotatable member 57 to the second rotatable member 58 and vice versa. The cam groove 71 and the cam follower 79 constitute a cam mechanism.

Figure 5:
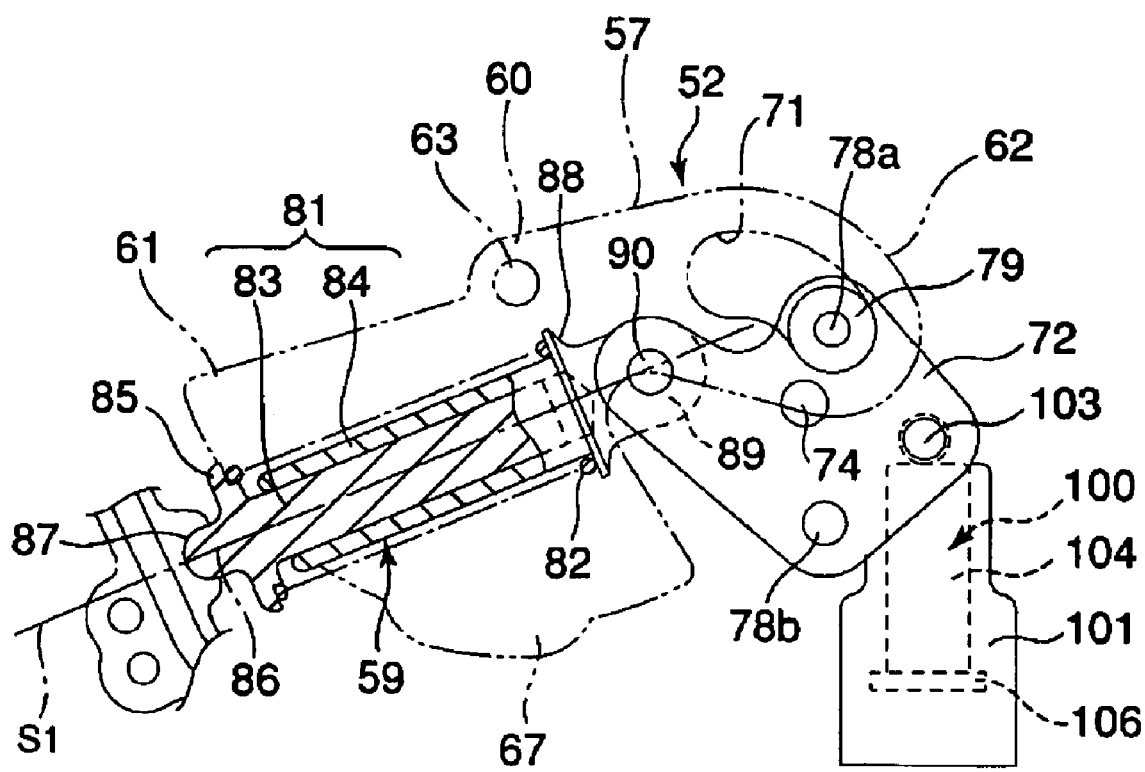
FIG. 5 is a side view, partially in cross-section, illustrating the positional relation among a link plate, a spring unit and a pressing pin of the clutch assist device of FIG. 4 at the time when the clutch operating lever is fully released.

In the illustrated embodiment, the spring unit 59 constitutes an auxiliary force member to provide an assist force when operating the clutch lever 9. The auxiliary force member, however, can take other forms, as explain below. As shown in FIG. 5, the spring unit 59 has a spring holder 81 and an auxiliary spring 82. The spring holder 81 has an inner cylinder 83 and an outer cylinder 84. The inner cylinder 83 is slidably fitted on the outer cylinder 84, which allows the spring holder 81 to expand and contract.

The inner cylinder 83 has a spring receiver 85 and a pivot end 86. The spring receiver 85 extends in a flange-like manner from an outer peripheral surface at one end of the inner cylinder 83. The pivot end 86 is located at one end of the inner cylinder 83 and is rotatably supported on a mounting seat 87 formed on a front end inside the case body 53.

The outer cylinder 84 has a spring receiver 88 and a connecting end 89. The spring receiver 88 extends in a flange-like manner from an outer peripheral surface at one end of the outer cylinder 84. The connecting end 89 is located at one end of the outer cylinder 84 and is rotatably connected to the link plate 72 of the second rotatable member 58 via a pin 90. Therefore, the spring holder 81 connects to a front end of the case body 53 and to the link plate 72 and extends generally in the longitudinal direction of the case body 53.

The auxiliary spring 82 preferably is a compression coil spring and is interposed between the spring receiver 85 of the inner cylinder 83 and the spring receiver 88 of the outer cylinder 84 in a compressed state. Therefore, the spring holder 81 is constantly biased in the direction in which it expands. When the clutch lever 9 is in the disengage start position, the pivot end 86 and the connecting end 89 of the spring holder 81, and the second and third pivot shafts 74 and 76 as the center of rotation of the second rotatable member 58 are positioned on a straight line S1 as shown in FIG. 11.

FIG. 4 and FIG. 5 show the state of the assist mechanism 52 at the time when the clutch lever 9 is in the fully released position. When the clutch lever 9 is in the fully released position, the second pivot shaft 74 of the link plate 72 and the third pivot shaft 76 of the link lever 73 are positioned below the straight line S1. Also, the spring unit 59 is inclined such that the connecting end 89 of the spring holder 81 is positioned higher than the pivot end 86. In addition, the cam groove 71 of the link plate 72 extends in the longitudinal direction of the case body 53 and is maintained in a convex upward position.

Figure 10:
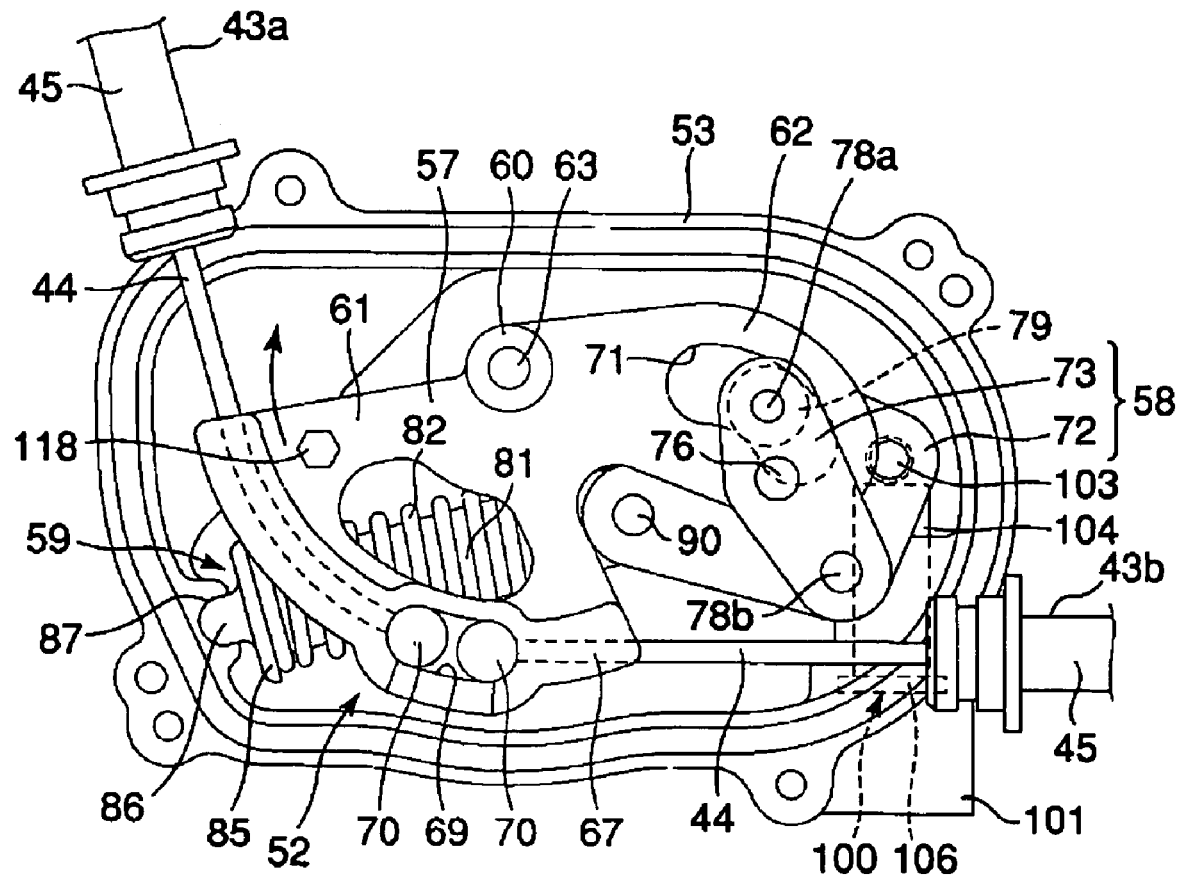
FIG. 10 is a side view of the clutch assist device of the first embodiment with a portion of the housing removed, illustrating the state of the clutch assist device at the time when the clutch operating lever has been moved to a disengage start position from the fully released position.
Figure 11:
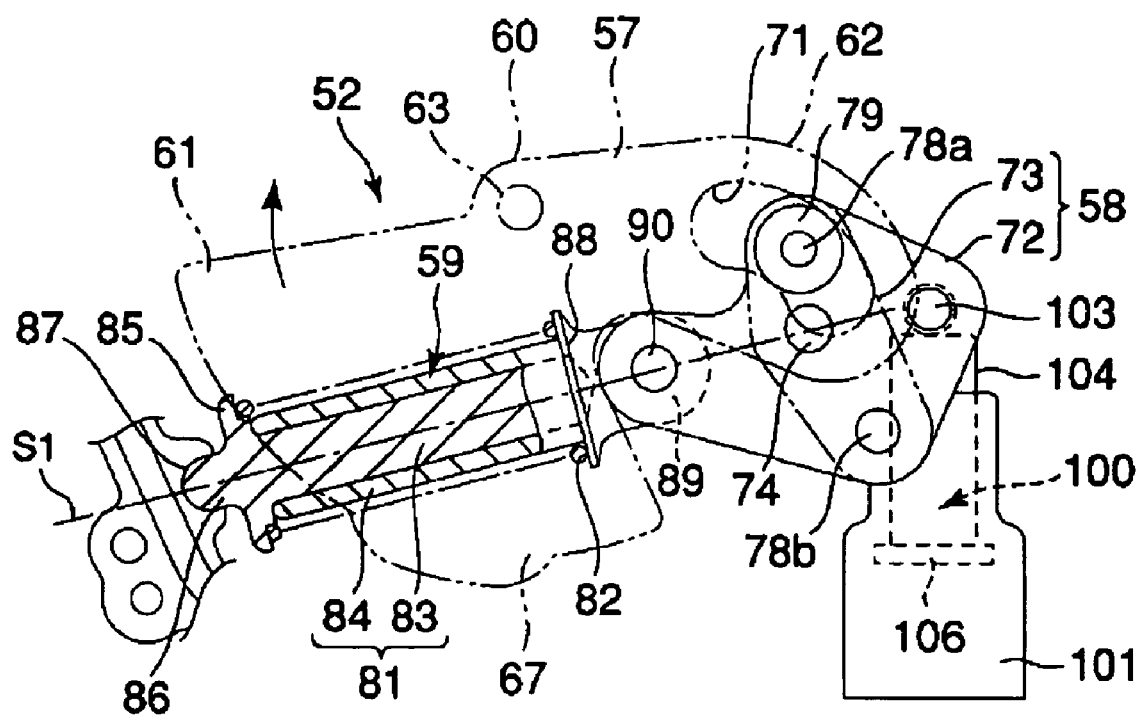
FIG. 11 is a side view, partially in cross-section, illustrating the positional relation among the link plate, the spring unit and the pressing pin at the time when the clutch operating lever is in the disengage start position in the first embodiment.
Figure 12:
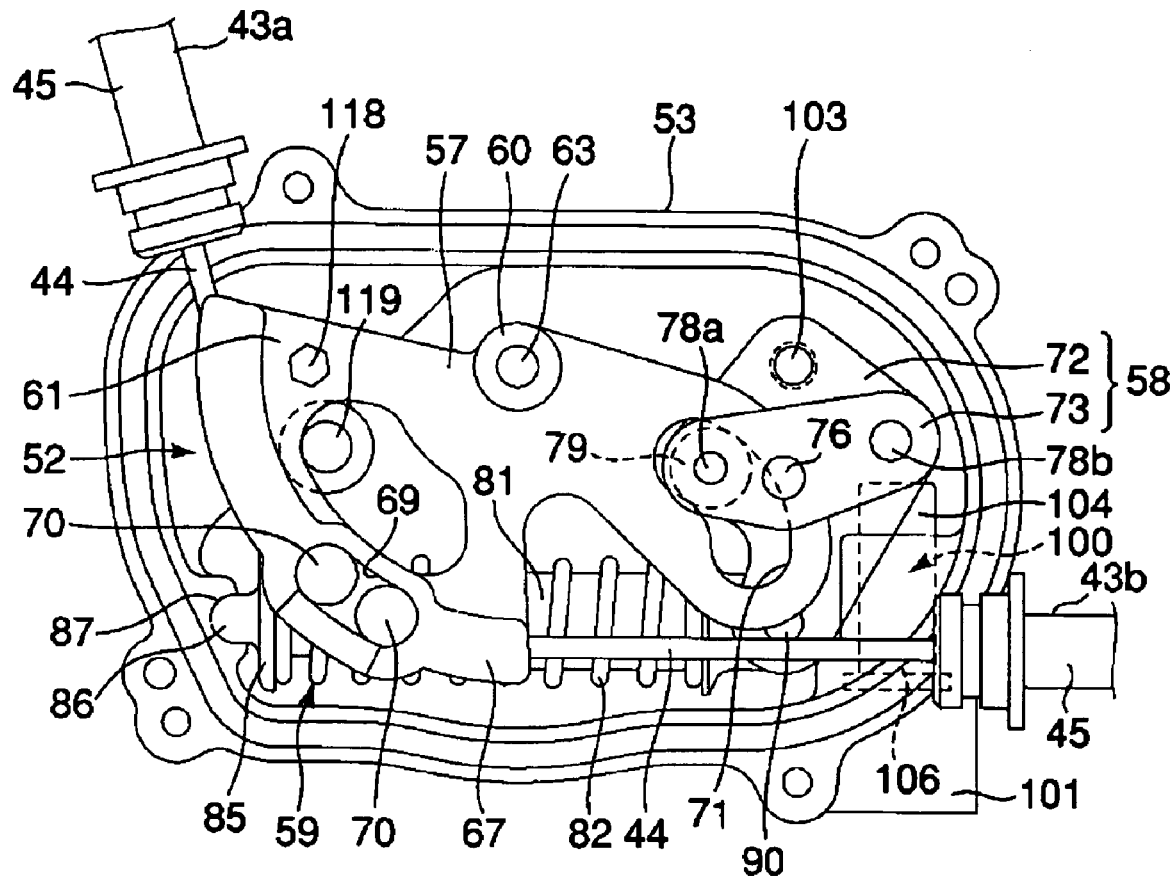
FIG. 12 is a side view of the clutch operating device of the first embodiment with a portion of the housing removed, illustrating the state of the assist mechanism at the time when the clutch operating lever is in a disengaged position.

When the rider moves the clutch lever 9 from the fully released position toward the disengage start position, the first rotatable member 57 is pulled upward via the first clutch wire 43a and is rotated in the clockwise direction as indicated by the arrows in FIG. 10 and FIG. 11. The rotation of the rotatable member 57 causes the lever part 62 having the cam groove 71 to move downward. Therefore, the cam follower 79, which is in contact with the cam groove 71, receives a force that urges it toward the front of the case body 53 and the link plate 72 and the link lever 73 are rotated in the counterclockwise direction. As a result, the spring unit 59 is rotated downward about the pivot end 86.

When the clutch lever 9 reaches the disengage start position, the second and third pivot shafts 74, 76 are positioned on the straight line S1, as shown in FIG. 11. Therefore, although the biasing force of the auxiliary spring 82 is being applied to the link plate 72 and the link lever 73, the link plate 72 and the link lever 73 are not rotated by the biasing force.

When the clutch lever 9 is moved from the disengage start position toward the disengaged position, the first rotatable member 57 is further rotated in the clockwise direction. The rotation of the first rotatable member 57 causes the lever part 62 having the cam groove 71 to move downward, and the cam groove 71 is brought to an upright position. Therefore, the cam follower 79 in contact with the cam groove 71 receives a force which urges it obliquely downward toward the front of the case body 53 and the link plate 72 and the link lever 73 are rotated in the counterclockwise direction.

In this embodiment, when the clutch lever 9 is moved from the disengage start position to the disengaged position, the spring unit 59 is rotated downward about the pivot end 86 and the straight line S1 connecting the pivot end 86 and the connecting end 89 of the spring unit 59 is offset to a position below the center of rotation of the link plate 72 and the link lever 73 (i.e., the axes of the pivot shafts 74, 76).

Therefore, the spring holder 81, which receives the urging force of the auxiliary spring 82, expands and the urging force of the auxiliary spring 82 acts as a force to rotate the link plate 72 and the link lever 73. Thus, when the clutch lever 9 is moved toward the disengaged position from the disengage start position, the link plate 72 and the link lever 73 are forcibly rotated in the counterclockwise direction by the auxiliary spring 82. Therefore, the urging force of the auxiliary spring 82 is added to the operating force the rider applies to squeeze the clutch lever 9. Thus, the load applied by the rider when operating the clutch lever 9 is reduced.

According to this embodiment, the shape of the cam groove 71 determines the timing at which the link plate 72 and the link lever 73 receive an urging force from the spring unit 59 and starts moving in the counterclockwise direction. More specifically, the cam groove 71 is of such a shape as to maintain the urging force of the auxiliary spring 82 applied from the link plate 72 and the link lever 73 to the first rotatable member 57 within a fixed range when the clutch lever 9 is moved from the midpoint between the disengage start position and the disengaged position toward the disengaged position.

In other words, the cam groove 71 is of such a shape as to permit the movement of the link plate 72 and the link lever 73 while the clutch lever 9 is moved from the disengage start position to the midpoint and as to restrict the movement of the link plate 72 and the link lever 73 to prevent the auxiliary spring 82 from expanding freely while the clutch lever 9 is moved from the midpoint to the disengaged position. Therefore, in this embodiment, the cam mechanism, which is comprised of the cam groove 71 and the cam follower 79, controls the urging force of the auxiliary spring 82 applied to the first rotatable member 57.

In FIG. 15, the curve designated as Y shows the change of the load applied to the clutch lever 9 when the clutch lever 9 is moved in such a direction as to disengage the friction clutch 18. As can be understood from curve Y, the load applied to the clutch lever 9 is always smaller than the load of the clutch spring 27 applied to the push lever 40 while the clutch lever 9 is moved to the disengaged position from the disengage start position. This is because when the link plate 72 is rotated in the counterclockwise direction by the force transmitted through the first clutch wire 43a, the urging force of the auxiliary spring 82 which forcibly urges the link plate 72 to rotate in the counterclockwise direction is added.

In addition, in this embodiment, since the shape of the cam groove 71 is determined as described before, the load applied to the clutch lever 9 can be maintained generally constant while the clutch lever 9 is moved from the midpoint between the disengage start position and the disengaged position to the disengaged position. As a result, the load applied to the push lever 40 and the load applied to the clutch lever 9 change with similar characteristics with respect to the wire stroke amount as shown in FIG. 15.

As described before, when the clutch lever 9 is in the fully released position, the second pivot shaft 74 of the link plate 72 and the third pivot shaft 76 of the link lever 73 are positioned below the straight line S1 as shown in FIG. 4 and FIG. 5. Therefore, the link plate 72 and the link lever 73 are urged in the clockwise direction, that is, in a direction opposite the direction to disengage the friction clutch 18, by the urging force of the auxiliary spring 82.

The force urging the link plate 72 in the clockwise direction serves as a counter assist force against the force to rotate the clutch lever 9 from the fully released position to the disengage start position. As a result, the initial input load necessary to squeeze the clutch lever 9 first is increased and the operability of the clutch lever 9 is adversely affected.

Figure 14:
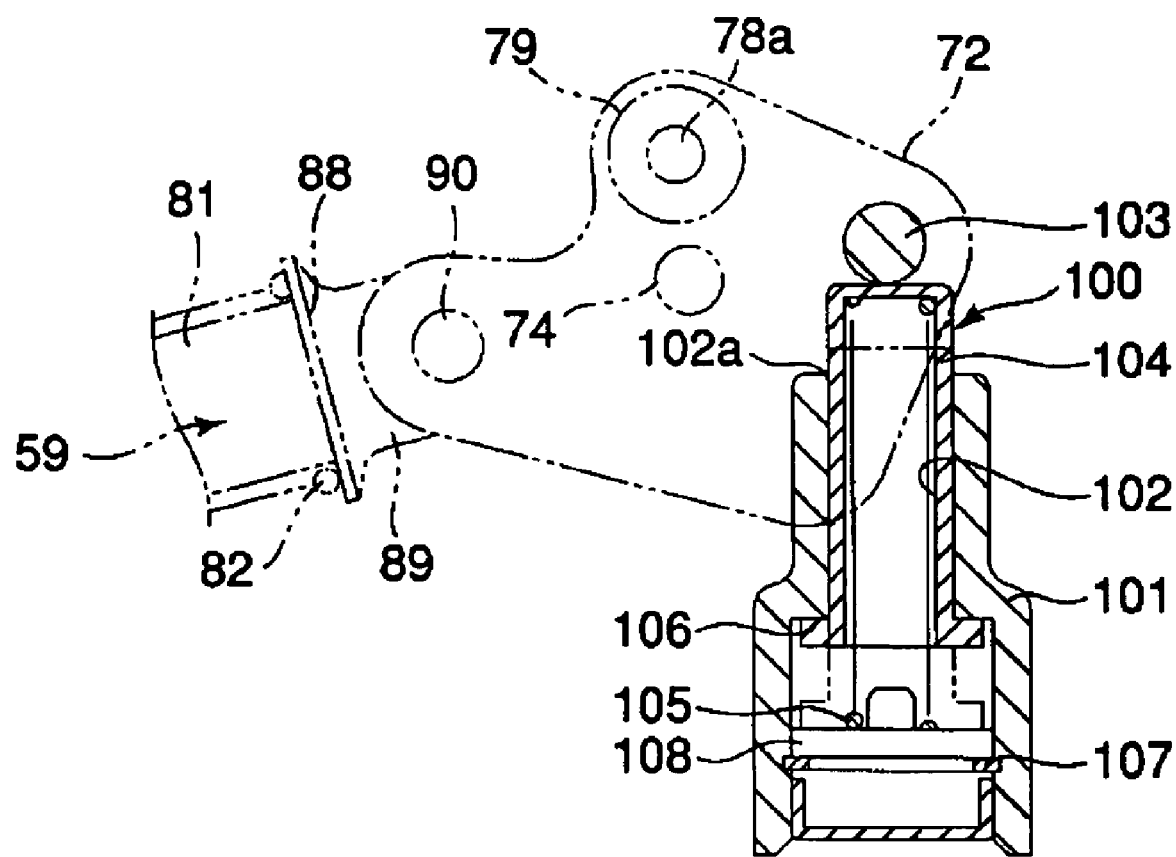
FIG. 14 is a cross-sectional view illustrating the positional relation between a canceling spring unit and a lock pin of the link plate of FIG. 13.

Therefore, in the clutch assist device 50 of this embodiment, a canceling spring unit 100 is incorporated in the case body 53 of the exterior case 51. As shown in FIG. 4 and FIG. 14, the case body 53 has a housing part 101 for housing the canceling spring unit 100. The housing part 101 is positioned at a lower part of the rear end of the case body 53 and is located on one side of the second wire introduction port 96.

As shown in FIG. 14, the housing part 101 has a cylinder 102 extending vertically. At the upper end of the cylinder 102 is formed an opening 102a opening into the exterior case 51. The opening 102a is opposed to a lock pin 103 secured to the link plate 72. The lock pin 103 is located at a position opposite the connecting end 89 where the link plate 72 is connected to the spring unit 59 with respect to the second pivot shaft 74.

As shown in FIG. 14, the canceling spring unit 100 has a pressing pin 104 and a canceling spring 105. The pressing pin 104 has a hollow shape with a closed upper end, and a flange-like stopper 106 is formed at the lower end of the pressing pin 104. The pressing pin 104 is slidably inserted into the cylinder 102 from below the housing part 101.

A spring receiver 108 is secured to the lower end of the housing part 101 via a circlip 107. The spring receiver 108 is located below the cylinder 102.

The canceling spring 105 preferably is a compression coil spring and is interposed between the upper inner surface of the pressing pin 104 and the spring receiver 108 in a compressed state. The canceling spring 105 constantly urges the pressing pin 104 upward. The urging force of the canceling spring 105 is set to a level slightly lower than that of the counter assist force caused by the auxiliary spring 82.

The pressing pin 104 is elastically movable between a first position where its upper end largely protrudes from the opening 102a of the cylinder 102 and a second position where its upper end slightly protrudes from the opening 102a of the cylinder 102. When the pressing pin 104 is in the first position, the stopper 106 of the pressing pin 104 abuts against the lower end of the cylinder 102 to restrict the position of the pressing pin 104. When the pressing pin 104 is in the second position, the stopper 106 of the pressing pin 104 abuts against the spring receiver 108 to restrict the position of the pressing pin 104.

While the clutch lever 9 is moved from the fully released position to the disengage start position, the upper end of the pressing pin 104 abuts against the lock pin 103 of the link plate 72 from below, as shown in FIG. 5 and FIG. 11. Therefore, the link plate 72 receives the urging force of the canceling spring 105 via the lock pin 103. As a result, the total of the urging force of the auxiliary spring 82 and the urging force of canceling spring 105 applied to the link plate 72 is almost zero and the link plate 72 is restricted from rotating in the clockwise direction when the clutch lever 9 is in the range of the free play.

Figure 13:
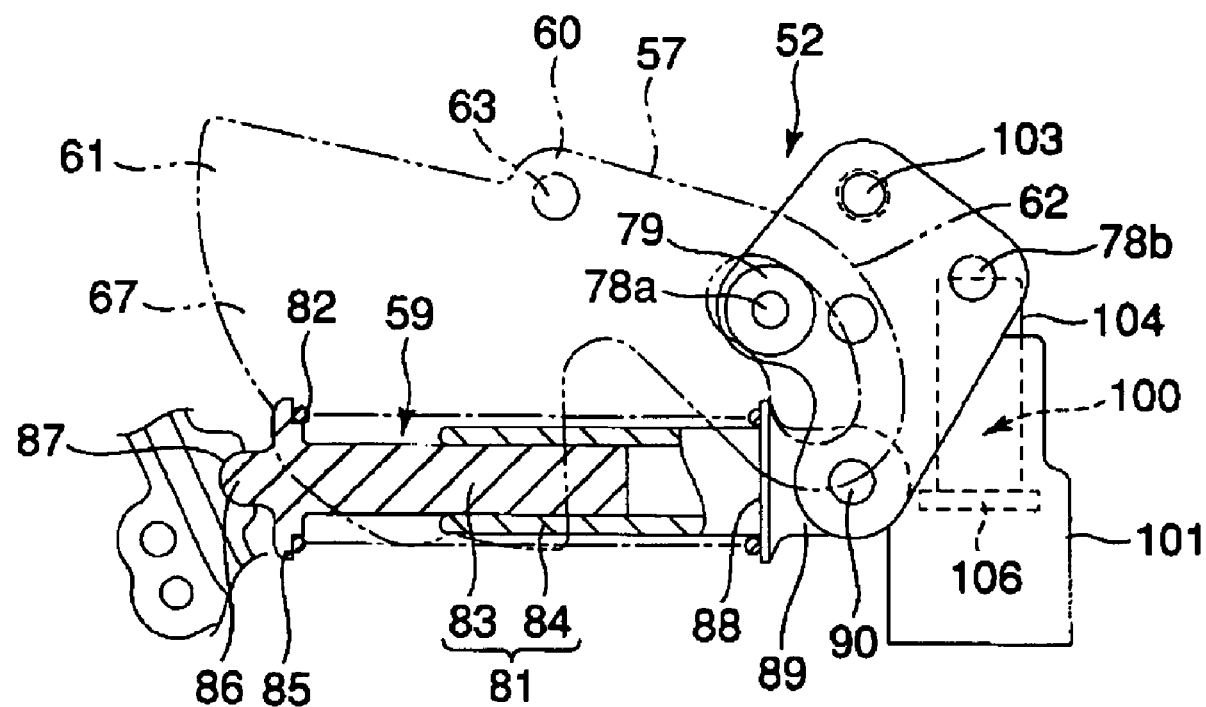
FIG. 13 is a side view, partially in cross-section, illustrating the positional relation among the link plate, the spring unit and the pressing pin at the time when the clutch operating lever is in the disengaged position in the first embodiment.

When the clutch lever 9 approaches the disengaged position from the disengage start position, the lock pin 103 of the link plate 72 is separated from the upper end of the pressing pin 104, as shown in FIG. 13. As a result, the pressing pin 104 is maintained in the first position by the urging force of the canceling spring 105, and the link plate 72 and the link lever 73 are forcibly rotated in the counterclockwise direction by the urging force of the auxiliary spring 82.

As shown in FIG. 3, FIG. 6 and FIG. 7, the case cover 54 of the exterior case 51 has a circular opening 110. The opening 110 is opposed to the wire connecting part 61 of the first rotatable member 57, and the engaging groove 68 and the engaging hole 69 of the wire connecting part 61 are exposed to the outside of the exterior case 51 through the opening 110. In other words, fingers or a tool can be inserted through the opening 110 to engage the inner wires 44 into the engaging groove 68 of the wire connecting part 61 or to engage the engaging elements 70 at the ends of the inner wires 44 into the engaging hole 69. Therefore, the inner wires 44 can be connected to the first rotatable member 57 with the case cover 54 secured to the case body 53.

The case cover 54 has a support wall 111 extending from the opening edge of the opening 110 to the center of the opening 110. The support wall 111 is located at a position which does not interfere with the wire connecting part 61 of the first rotatable member 57 and has a boss part 113 with a screw hole 112 at its end. The position of the screw hole 112 preferably coincides with the center of the opening 110.

The opening 110 is covered with a disk-like lid 114 (see FIG. 1). The lid 114 is removably fitted in the opening 110 and fixed to the support wall 111 by a bolt 115 (see FIG. 6). The bolt 115 extends through the center of the lid 114 and is threaded into the screw hole 112 of the boss part 113.

As shown in FIG. 3 and FIG. 9, the wire connecting part 61 of the first rotatable member 57 has a hexagonal insertion hole 118. The insertion hole 118 is located in the area of the opening 110, and is at a position which corresponds to a positioning recess 119 of the case body 53 when the clutch lever 9 is in the correct disengage start position. Therefore, by inserting a tool such as a hexagonal wrench into the insertion hole 118 through the opening 110 and engaging the tip of the tool into the recess 119, the first rotatable member 57 can be held in the position shown in FIG. 10.

Thus, the position of the first rotatable member 57 at the time when the clutch lever 9 is in the correct disengage start position can be determined, and, in this state, adjustment of the free play of the clutch wire 43 and connection of the inner wires 44 can be carried out.

According to this embodiment, the assist mechanism 52 installed at an intermediate point of the clutch wire 43 maintains the urging force of the auxiliary spring 82 applied to the clutch wire 43 via the first rotatable member 57 within a fixed range while the clutch lever 9 is moved from the midpoint between the disengage start position and the disengaged position to the disengaged position.

Therefore, the load applied from the clutch spring 27 to the push lever 40 of the clutch release mechanism 28 and the actual load applied to the clutch lever 9 thorough the assist mechanism 52 change with similar characteristics with respect to the wire stroke amount.

As a result, the clutch lever 9 can be prevented from becoming suddenly light when it gets close to the disengaged position in disengaging the frictional clutch 18 although the urging force of the auxiliary spring 82 is applied to the clutch wire 43. Thus, the force necessary to operate the clutch lever 9 is reduced, and the clutch lever 9 can be operated with the same operating feel as in operating a conventional clutch lever. The operation of the clutch lever 9 does not cause any uncomfortable feeling, and the operability of the clutch lever 9 can be improved.

In addition, according to this embodiment, the first clutch wire 43a and the second clutch wire 43b are moved with a one-to-one relationship between them being maintained. Therefore, the assist mechanism 52 can be installed in the length of clutch cable, through which the motion of the clutch lever 9 is transmitted to the push lever 40, without changing the construction of the friction clutch 18.

Also, the inner wire 44 of the first clutch wire 43a and the inner wire 44 of the second clutch wire 43b are received on the lower edge 67 of the first rotatable member 57 and are connected to the first rotatable member 57. As seen in FIG. 4, the lower edge 67 is curved along the arcuate curve A connecting the first wire introduction port 95a and the second wire introduction port 96 and rotatable along the curve A. Therefore, when the first rotatable member 57 is rotated, the direction in which the inner wires 44 are curved can be guided.

In addition, only the inner wires 44 of the first and second clutch wires 43a and 43b are introduced into the exterior case 51 and received on the lower edge 67 of the first rotatable member 57. Therefore, since no outer tube 45 exists where the inner wires 44 are curved in an arc, the inner wires 44 are not pressed strongly against the outer tubes 45.

Moreover, since the second clutch wire 43b extends linearly to the push lever 40 of the clutch release mechanism 28, only small sliding resistance is generated between the inner wire 44 and the outer tube 45 of the second clutch wire 43b.

Therefore, since the assist mechanism 52 is located where the clutch wire 43 is curved, the resistance applied to the clutch wire 43 when the clutch lever 9 is operated is small. Thus, although the direction of the clutch wire 43 is largely changed on the left side of the engine 13, the clutch wire 43 can be moved smoothly, and the urging force applied from the assist mechanism 52 to the clutch wire 43 when the friction clutch 18 is disengaged is not decreased.

Accordingly, the assisting function of the assist mechanism 52 can be fully realized and the operability of the clutch lever 9 in disengaging the friction clutch 18 is improved.

Second Embodiment

In the second embodiment, the clutch assist device 50 according to the first embodiment is modified as shown in FIG. 16 to FIG. 25. The clutch assist device 50 of the first embodiment is further decreased in size in accordance with the second embodiment of a clutch assist device. In the following description, those parts corresponding to the components of the first embodiments are identified with the same reference numerals.

Figure 16:
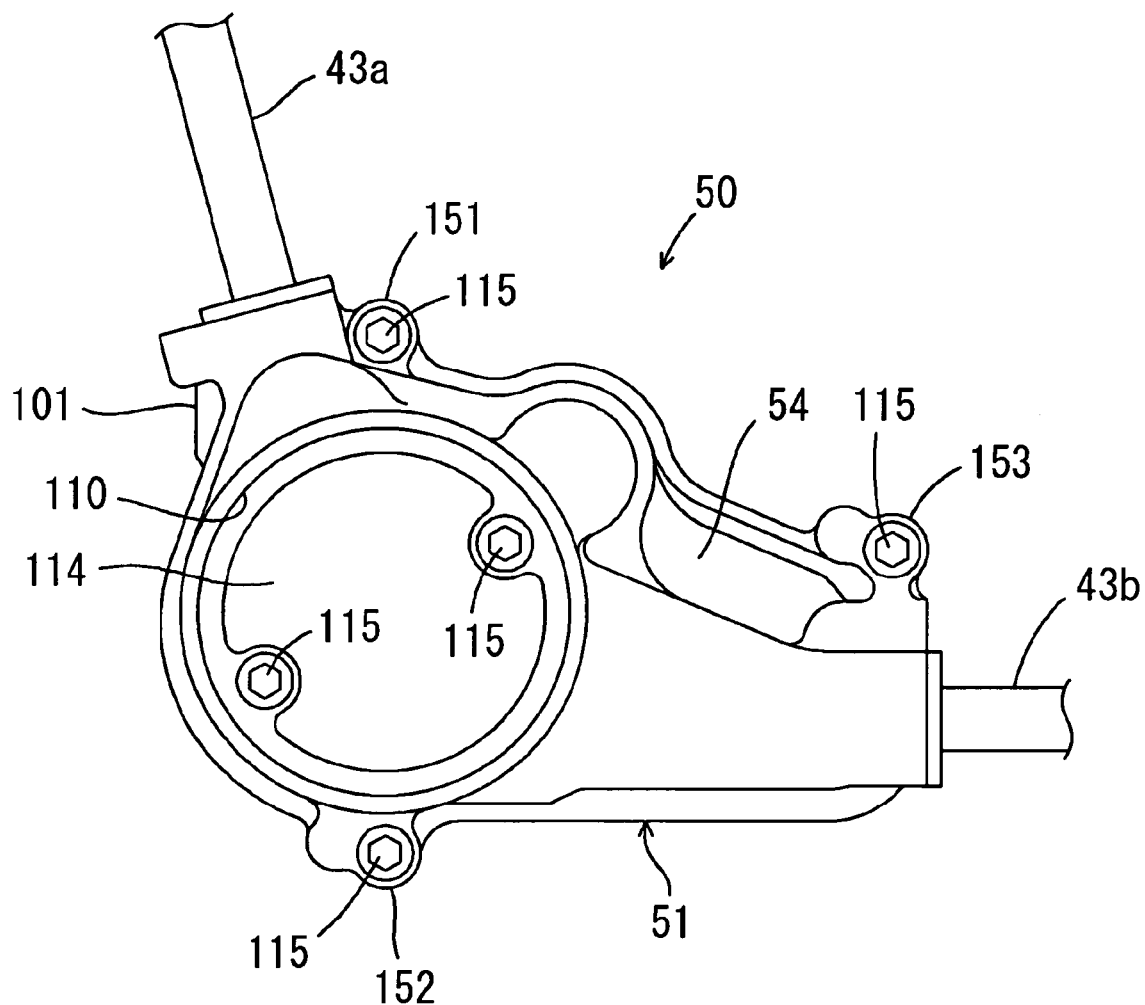
FIG. 16 is a side view of a clutch assist device configured in accordance with a second embodiment of the present invention.
Figure 17:
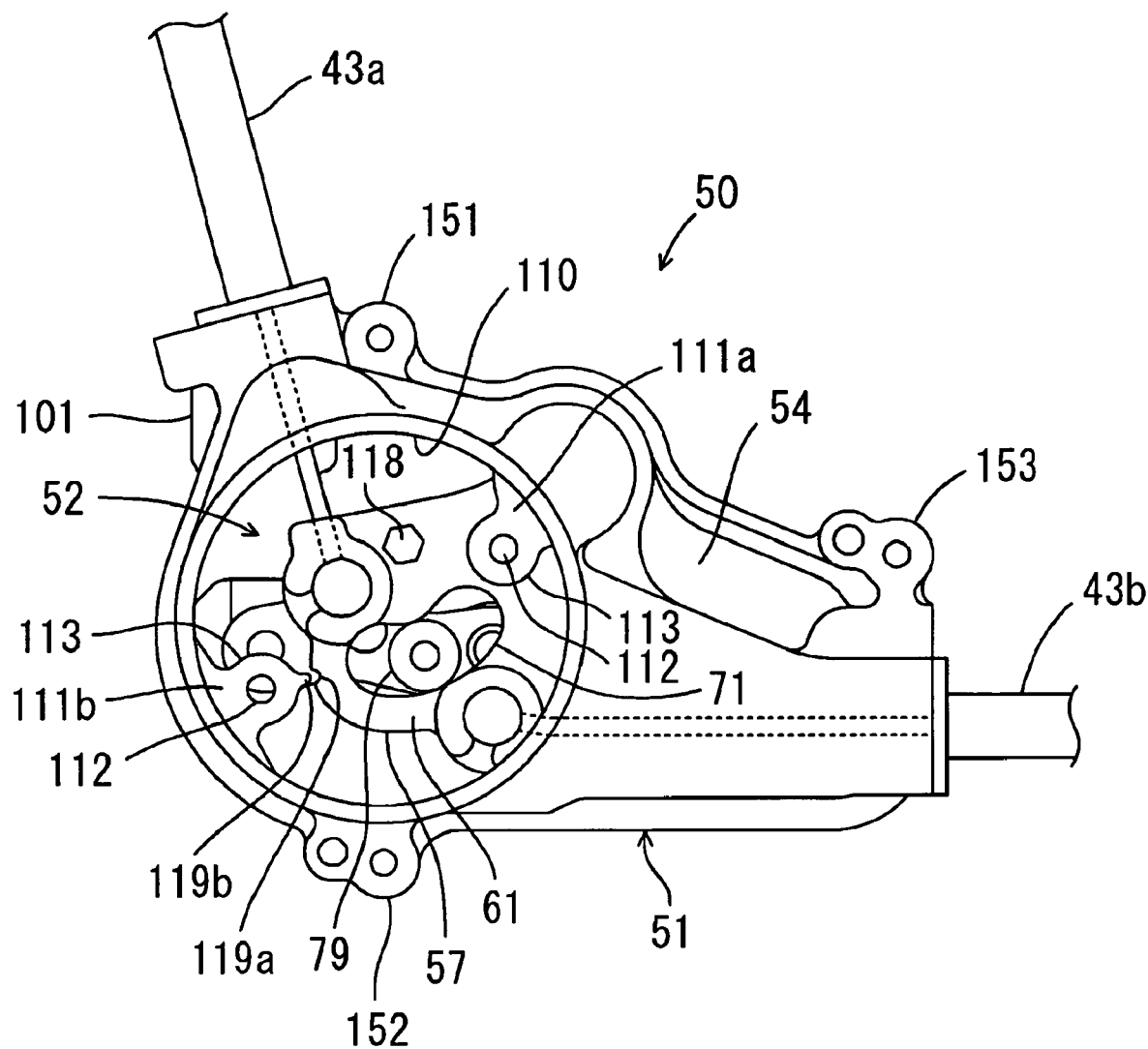
FIG. 17 is a side view illustrating the state in which a lid of the clutch assist device according to the second embodiment has been removed.
Figure 18:
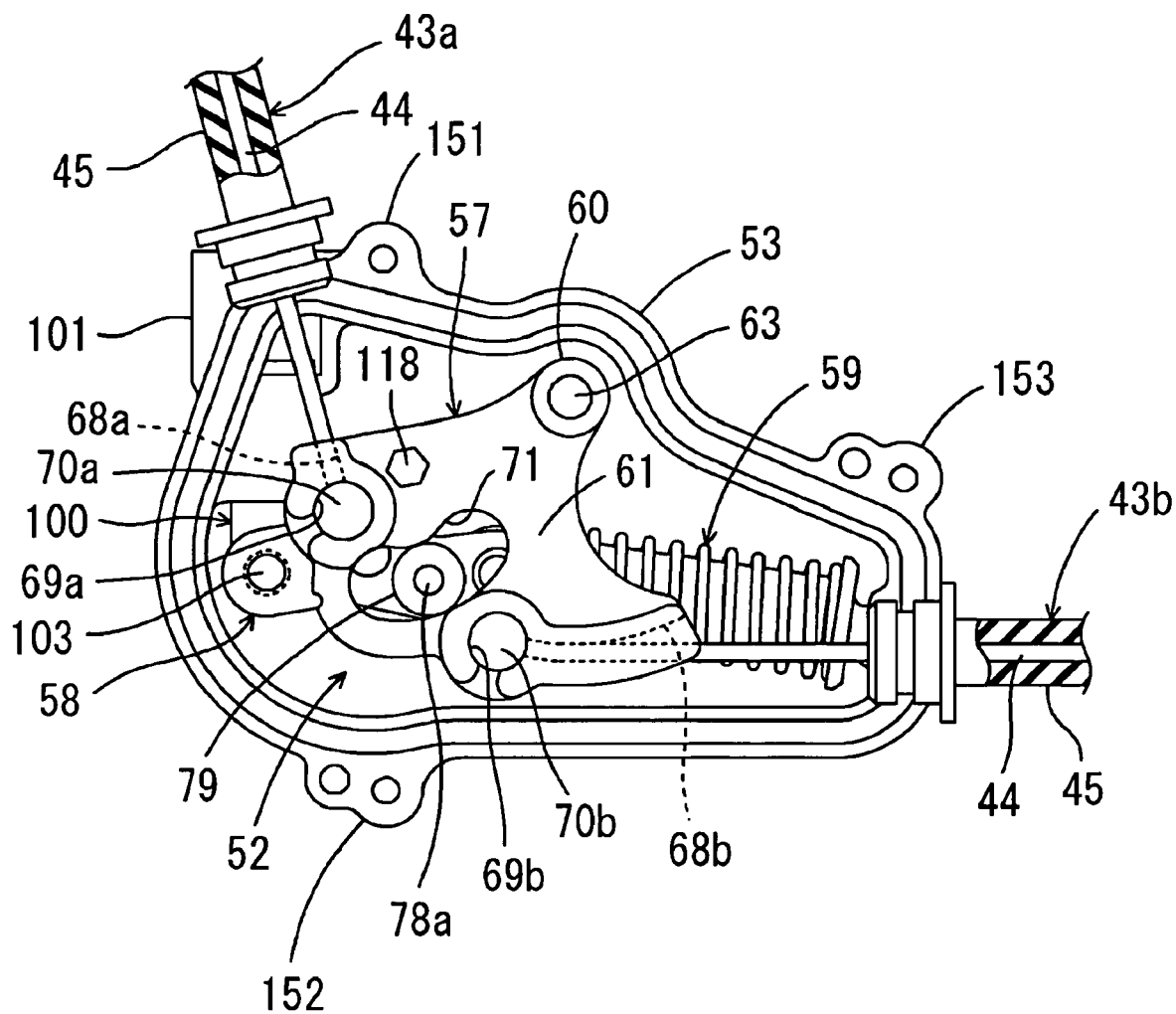
FIG. 18 is a side view of the clutch assist device of the second embodiment, illustrating the state of the assist mechanism at the time when the clutch operating lever is in a disengage start position.

As shown in FIG. 16 to FIG. 18, the second embodiment of the clutch assist device 50 also preferably has an exterior case 51 and an assist mechanism 52. The exterior case 51 has a case body 53 and a case cover 54. In the second embodiment, the areas of the case body 53 and the case cover 54 as viewed from a side are smaller than those in the first embodiment.

As shown in FIG. 16 and FIG. 18, each of the case body 53 and the case cover 54 has first, second and third fastening parts 151, 152 and 153, each having a bolt hole. The case body 53 and the case cover 54 are secured to each other at the fastening parts 151, 152 and 153 by bolts 115.

As shown in FIG. 18, the assist mechanism 52 has a first rotatable member 57, a second rotatable member 58, a spring unit 59, and a canceling spring unit 100.

The first rotatable member 57 has a pivot part 60 and a wire connecting part 61. As shown in FIG. 4, the first rotatable member 57 of the first embodiment has a lever part 62 having the cam groove 71 in addition to the wire connecting part 61. The rotatable member 57 of the second embodiment, however, does not have the lever part 62 and the wire connecting part 61 has a cam groove 71, as shown in FIG. 18. In this embodiment, since the lever part 62 is omitted, the area of the first rotatable member 57 is smaller. The first rotatable member 57 is generally in the form of a sector wits a central angle of smaller than 120° as viewed along the axial direction of the first pivot shaft 63. The shape of the first rotatable member 57 is not specifically limited, though. The first rotatable member 57 may have other shape as well, such as, for example, be triangular. The first rotatable member 57 may be made even smaller in size in some applications. For example, the first rotatable member 57, in the illustrated embodiment, is generally in the form of a sector with a central angle of less than 90°.

Figure 24:
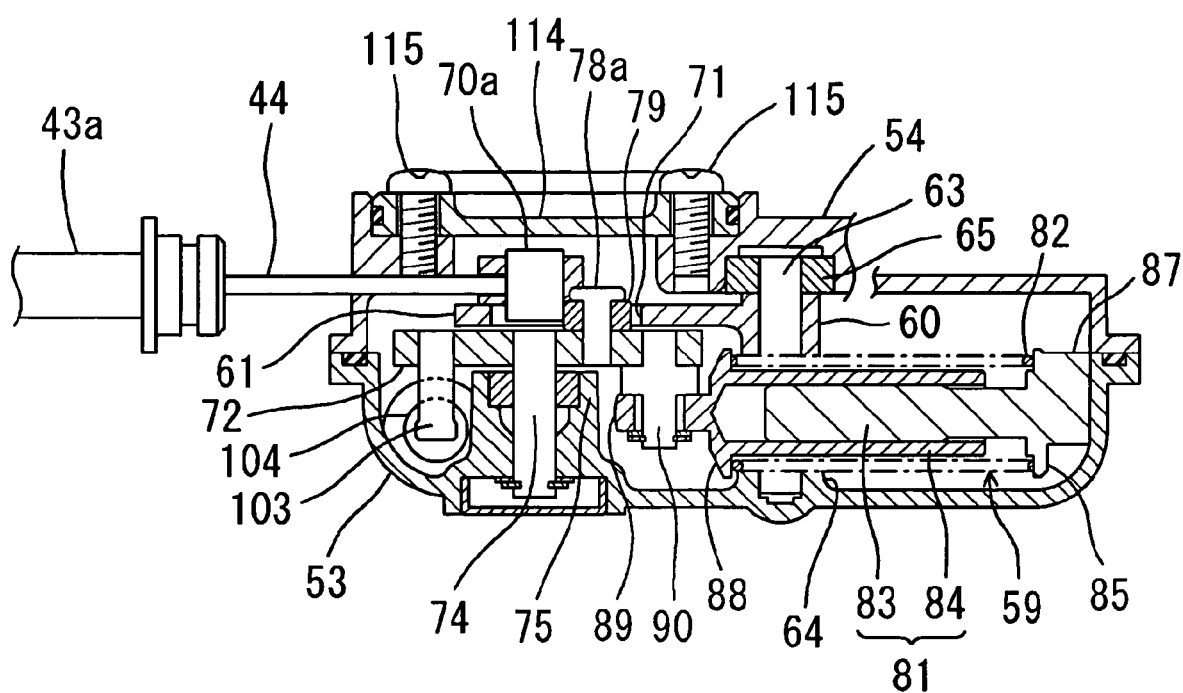
FIG. 24 is a cross-sectional view of the clutch assist device according to the second embodiment.

As shown in FIG. 24, the pivot part 60 is rotatably supported by a boss part 64 of the case body 53 via the first pivot shaft 63. The end of the first pivot shaft 63 opposite the boss part 64 is supported by a bearing part 65 of the case cover 54.

Figure 25:
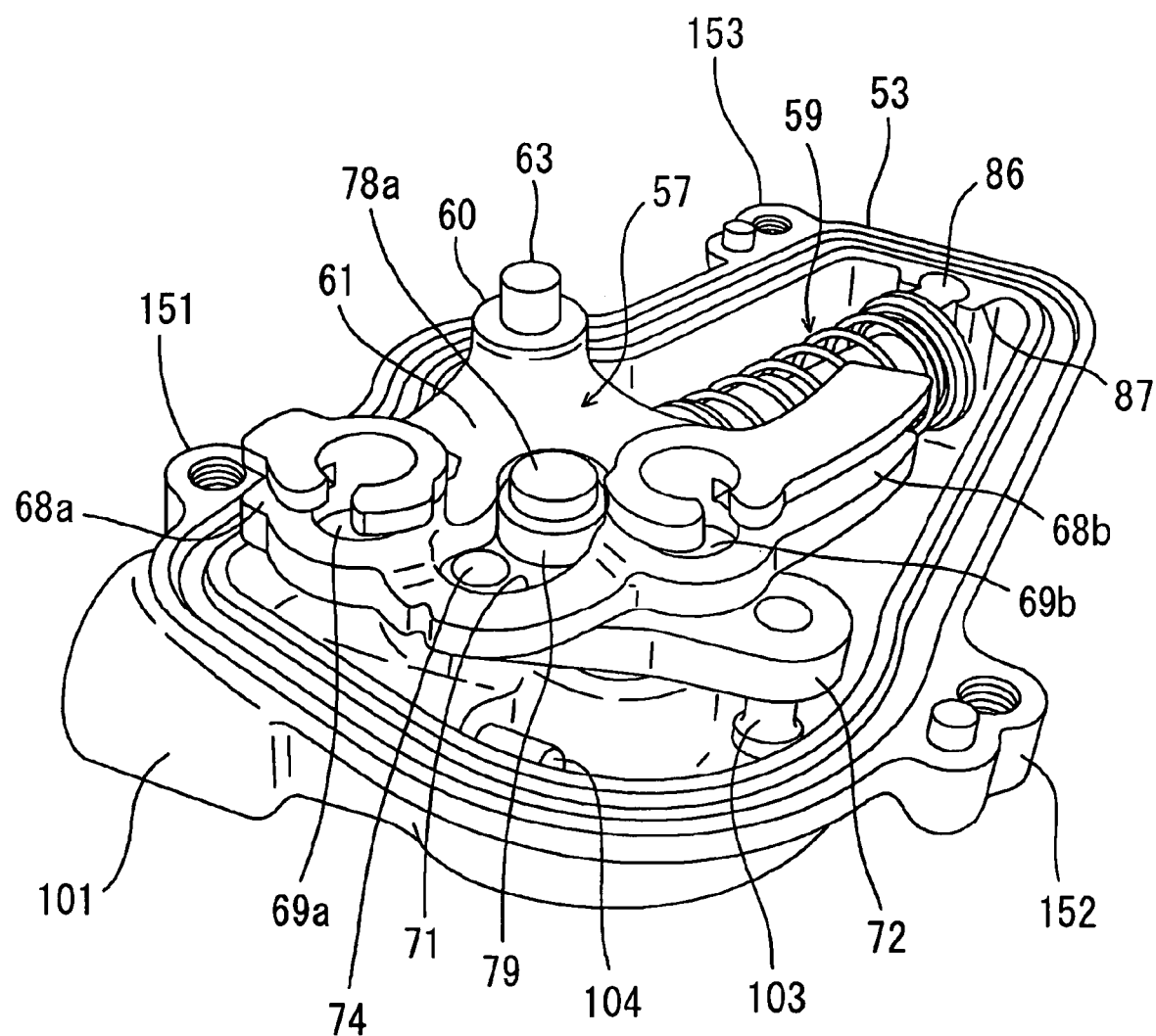
FIG. 25 is a perspective view of the clutch assist device according to the second embodiment.

As shown in FIG. 18 and FIG. 25, the wire connecting part 61 has a first engaging groove 68a and a first engaging hole 69a at one end of its lower edge. The wire connecting part 61 has a second engaging groove 68b and a second engaging hole 69b at the other end of its lower edge.

The inner wire 44 of the first clutch wire 43a is received in the first engaging groove 68a. The first engaging grooves 68a opens at the outer peripheral surface of the lower edge. The first engaging hole 69a is of a circular shape. The first engaging hole 69a opens at the outer peripheral surface of the lower edge and in the first engaging groove 68a. An engaging element 70a with a cylindrical shape is attached to an end of the inner wire 44 of the first clutch wire 43a. The engaging element 70a is engaged with the opening edge of the first engaging hole 69a. The inner wire 44 of the first clutch wire 43a is thereby engaged with the wire connecting part 61.

The inner wire 44 of the second clutch wire 43b is received in the second engaging groove 68b. The second engaging grooves 68b opens at the outer peripheral surface of the lower edge. The second engaging hole 69b is also of a circular shape. The second engaging hole 69b opens at the outer peripheral surface of the lower edge and in the second engaging groove 68b. An engaging element 70b with a cylindrical shape secured to an end of the inner wire 44 of the second clutch wire 43b is engaged with the opening edge of the second engaging hole 69b. The inner wire 44 of the second clutch wire 43b is thereby engaged with the wire connecting part 61.

The first engaging groove 68a and the second engaging groove 68b are each curved in an arc around the first pivot shaft 63. The inner wire 44 of the first clutch wire 43a and the inner wire 44 of the second clutch wire 43b are integrally connected to each other via the first rotatable member 57. Therefore, the inner wire 44 of the first clutch wire 43a and the inner wire 44 of the second clutch wire 43b can move together at the same displacement rate. Since the distance from the first pivot shaft 63 to the engaging element 70a and the distance from the first pivot shaft 63 to the engaging element 70b are equal, the inner wires 44 can move through the same distance.

The cam groove 71 is located between the first engaging hole 69a and the second engaging hole 69b. The cam groove 71 is a curved slot which is concave toward the first engaging hole 69a.

Figure 19:
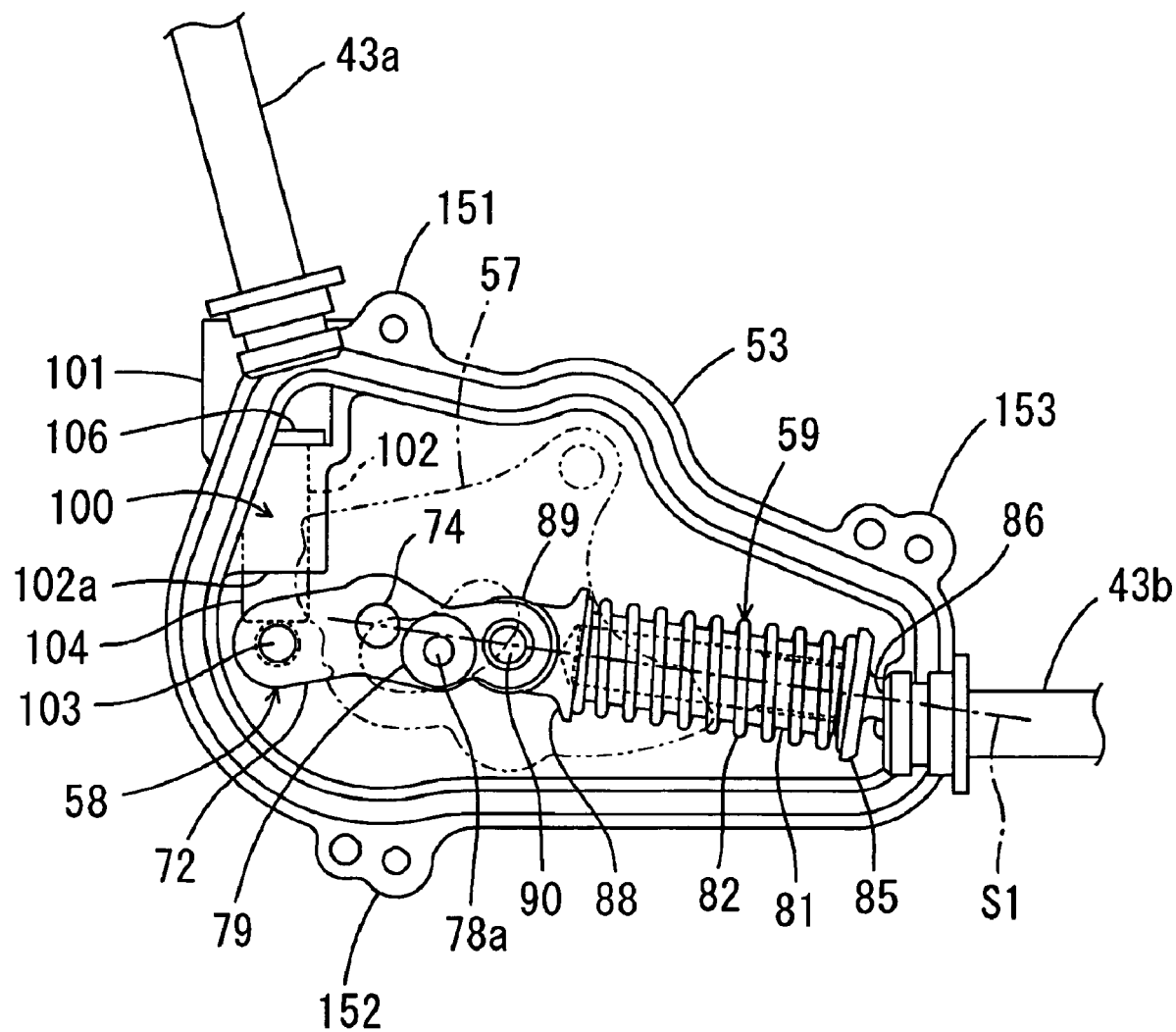
FIG. 19 is a side view of the clutch assist device of the second embodiment, illustrating the state of a part of the assist mechanism at the time when the clutch operating lever is in a disengage start position.

The second rotatable member 58 of the first embodiment has a link plate 72 and a link lever 73 (see FIG. 4). However, in this embodiment, the second rotatable member 58 is comprised of only a link plate 72 as shown in FIG. 19. The link plate 72 is located on the reverse side of the first rotatable member 57. The link plate 72 is rotatably supported by a boss part 75 (see FIG. 24) of the case body 53 via a second pivot shaft 74.

A first pin 78a, which extends to the front side of the first rotatable member 57, is joined to the link plate 72. A cam follower 79, such as a roller, is rotatably supported by the first pin 78a. The cam follower 79 is located in the cam groove 71 and in contact with the inner surface of the cam groove 71.

Therefore, the cam groove 71 and the cam follower 79 can transmit a force from the first rotatable member 57 to the second rotatable member 58 or from the second rotatable member 58 to the first rotatable member 57 when the first rotatable member 57 or the second rotatable member 58 rotates. The cam groove 71 and the cam follower 79 comprise a cam mechanism.

Figure 21:
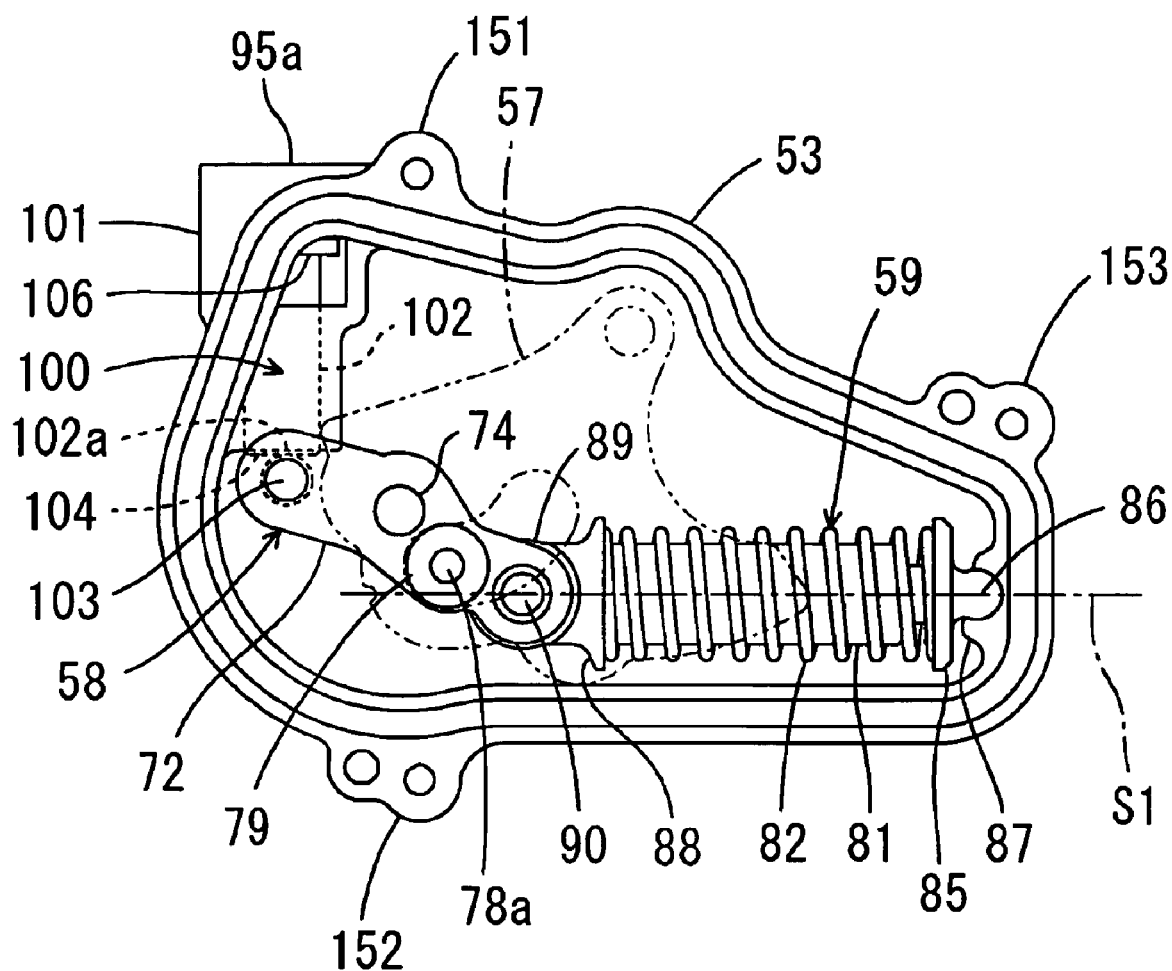
FIG. 21 is a side view of the clutch assist device of the second embodiment, illustrating the state of a part of the assist mechanism at the time when the clutch operating lever is fully released.
Figure 22:
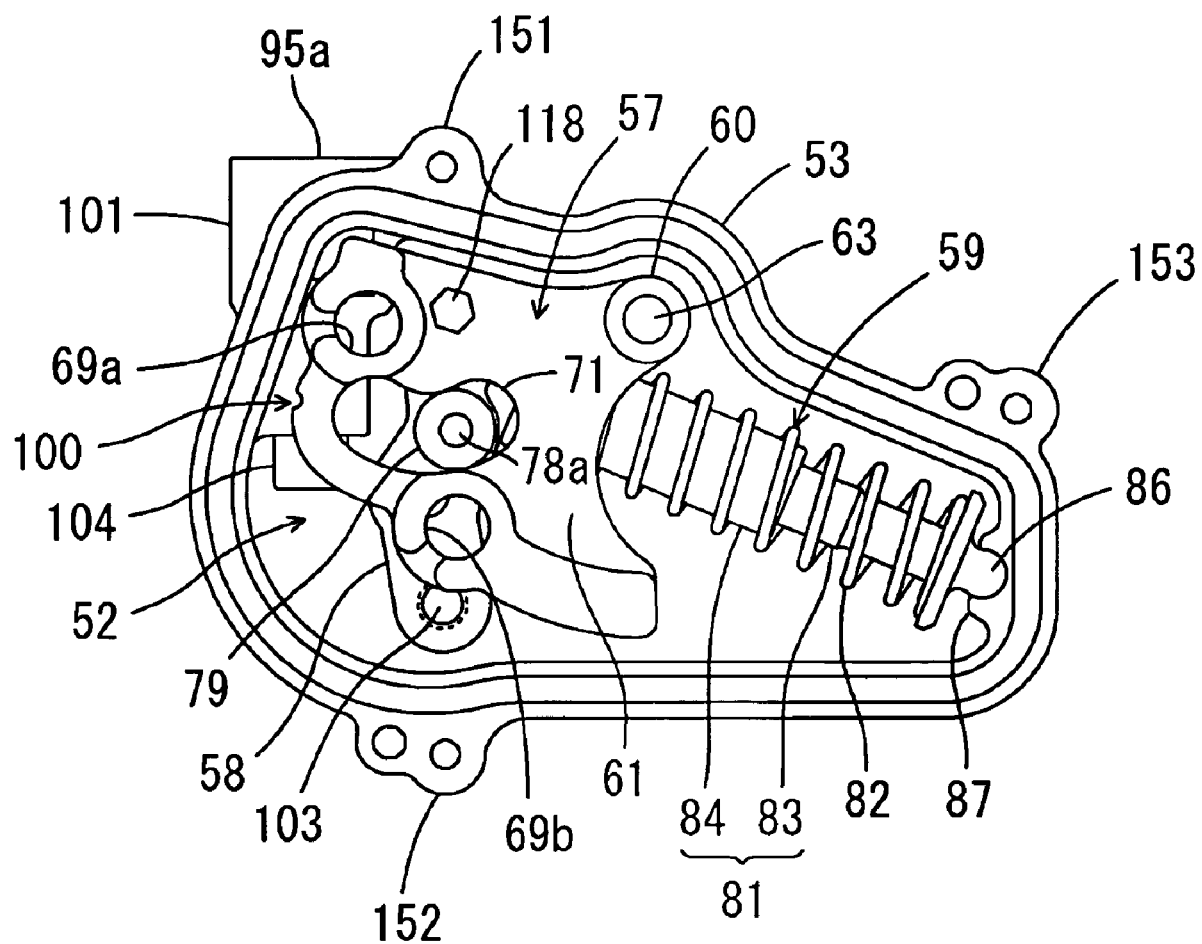
FIG. 22 is a side view of the clutch assist device of the second first embodiment, illustrating the state of the assist mechanism at the time when the clutch operating lever is in a disengaged position.

The construction of the spring unit 59 is the same as that of the first embodiment. However, the spring unit 59 is attached at a different position and in a different posture in this embodiment. As shown in FIG. 21, the mounting seat 87 for supporting the pivot end 86 of the spring unit 59 is disposed at a rear end (at a right-hand end in FIG. 21) in the case body 53 in this embodiment. The spring unit 59 extends forward or obliquely forward from a rear end in the case body 53 (see FIG. 23).

As shown in FIG. 19, the connecting end 89 of the spring unit 59 is rotatably connected to the link plate 72 of the second rotatable member 58 via a pin 90. When the clutch lever 9 is in the disengage start position (in the state shown in FIG. 19), the pivot end 86 and the connecting end 89 of the spring holder 81 and the second pivot shaft 74 as the center of rotation of the second rotatable member 58 are positioned on a straight line S1.

Figure 20:
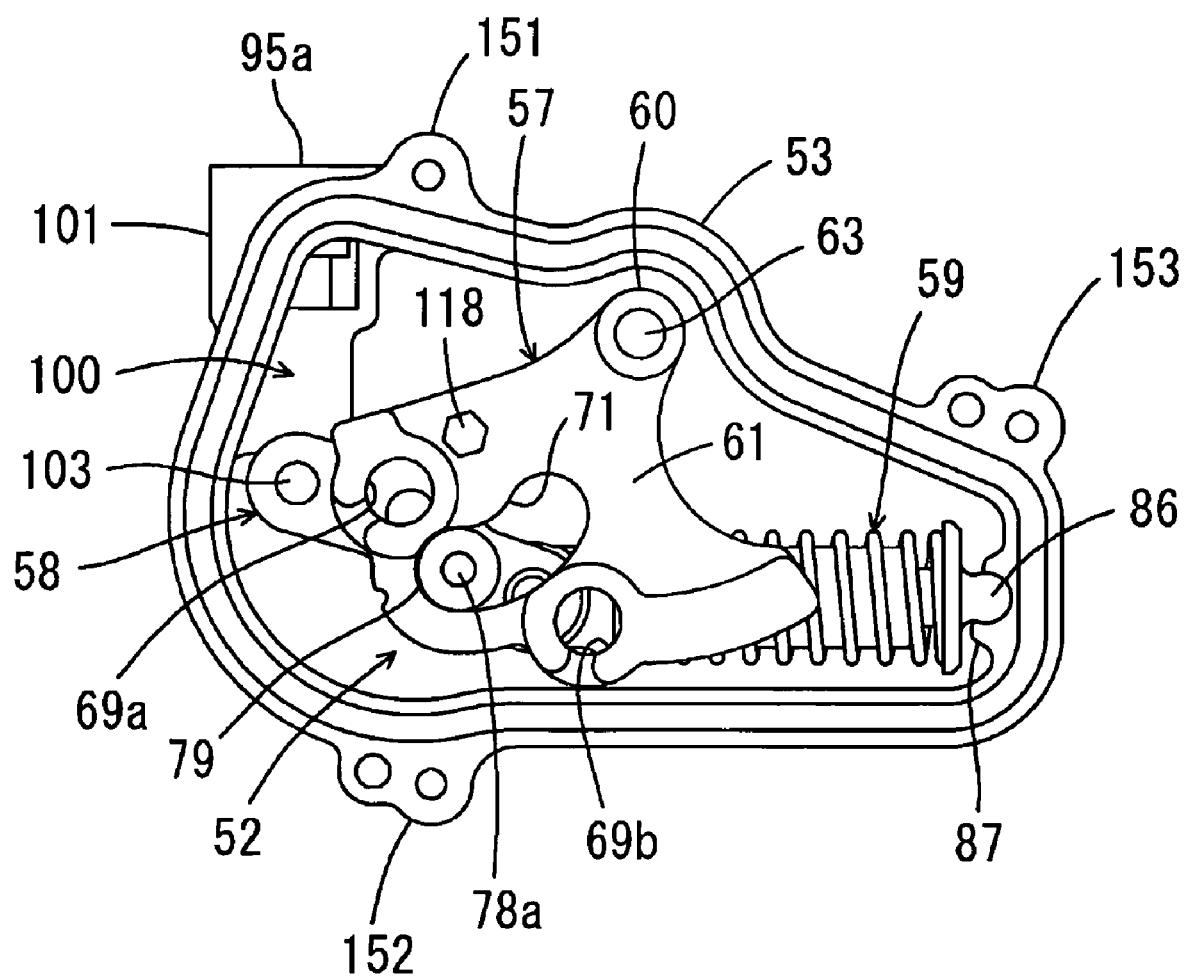
FIG. 20 is a side view of the clutch assist device of the second embodiment, illustrating the state of an assist mechanism at the time when the clutch operating lever is fully released.

FIG. 20 and FIG. 21 show the state of the assist mechanism 52 at the time when the clutch lever 9 is in the fully released position. When the clutch lever 9 is in the fully released position, the second pivot shaft 74 of the link plate 72 is positioned above the straight line S1 connecting the pivot end 86 and the connecting end 89 of the spring holder 81, as shown in FIG. 21. The cam follower 79 is positioned at the left end of the cam groove 71.

When the rider moves the clutch lever 9 from the fully released position toward the disengage start position, the first rotatable member 57 is pulled upward via the first clutch wire 43a and is rotated in the clockwise direction about the first pivot shaft 63. The rotation of the first rotatable member 57 causes the cam groove 71 to rotate (also in the clockwise direction) about the pivot shaft 63 and to move upward. Therefore, the cam follower 79 in contact with the cam groove 71 receives a force which urges it upward, and the link plate 72 is rotated in the counterclockwise direction about the second pivot shaft 74. As a result, the spring unit 59 is rotated in the clockwise direction about the pivot end 86.

When the clutch lever 9 reaches the disengage start position, the second pivot shaft 74 is positioned on the straight line S1 connecting the pivot end 86 and the connecting end 89 of the spring holder 81, as shown in FIG. 19. Therefore, the urging force of the auxiliary spring 82 does not act to rotate the link plate 72 at this position.

When the clutch lever 9 is moved from the disengage start position toward the disengaged position, the first rotatable member 57 is further rotated in the clockwise direction. The rotation of the first rotatable member 57 causes the cam groove 71 to rotate further about the pivot shaft 63 and move upward. At this time, the cam groove 71 is brought to a generally horizontal position. As a result, the cam follower 79 in contact with the cam groove 71 receives a force which urges it toward the top or front of the case body 53, and the link plate 72 is further rotated in the counterclockwise direction.

When the clutch lever 9 is moved from the disengage start position to the disengaged position, the spring unit 59 is further rotated in the clockwise direction about the pivot end 86. Then, the straight line S1 (connecting the pivot end 86 and the connecting end 89 of the spring unit 59) is offset upward from the center of rotation of the link plate 72 (pivot shaft 74).

Therefore, the spring holder 81 receiving the urging force of the auxiliary spring 82 expands, and the urging force of the auxiliary spring 82 is transmitted to the link plate 72 and acts as a force to rotate the link plate 72 in the counterclockwise direction. Thus, when the clutch lever 9 is moved toward the disengaged position from the disengage start position, the link plate 72 is forcibly rotated in the counterclockwise direction by the auxiliary spring 82. The urging force of the auxiliary spring 82 is added to the operating force the rider applies to squeeze the clutch lever 9, and the load on the rider in operating the clutch lever 9 is reduced.

Also in this embodiment, the cam groove 71 determines the timing at which the link plate 72 receives an urging force from the spring unit 59 and starts moving in the counterclockwise direction. The cam groove 71 is of such a shape as to change the angular velocity ratio, which is the ratio of the angular velocity of the second rotatable member 58 to the angular velocity of the first rotatable member 57, while the clutch lever 9 is moved from the disengage start position to the disengaged position. The cam groove 71 is of such a shape that the urging force of the auxiliary spring 82 transmitted to the first rotatable member 57 via the link plate 72 (more specifically, the moment which rotates the first rotatable member 57 in the clockwise direction) can increase more rapidly than in a conventional device in the initial stage of the process where the clutch lever 9 is moved from the disengage start position to the midpoint.

Figure 34:
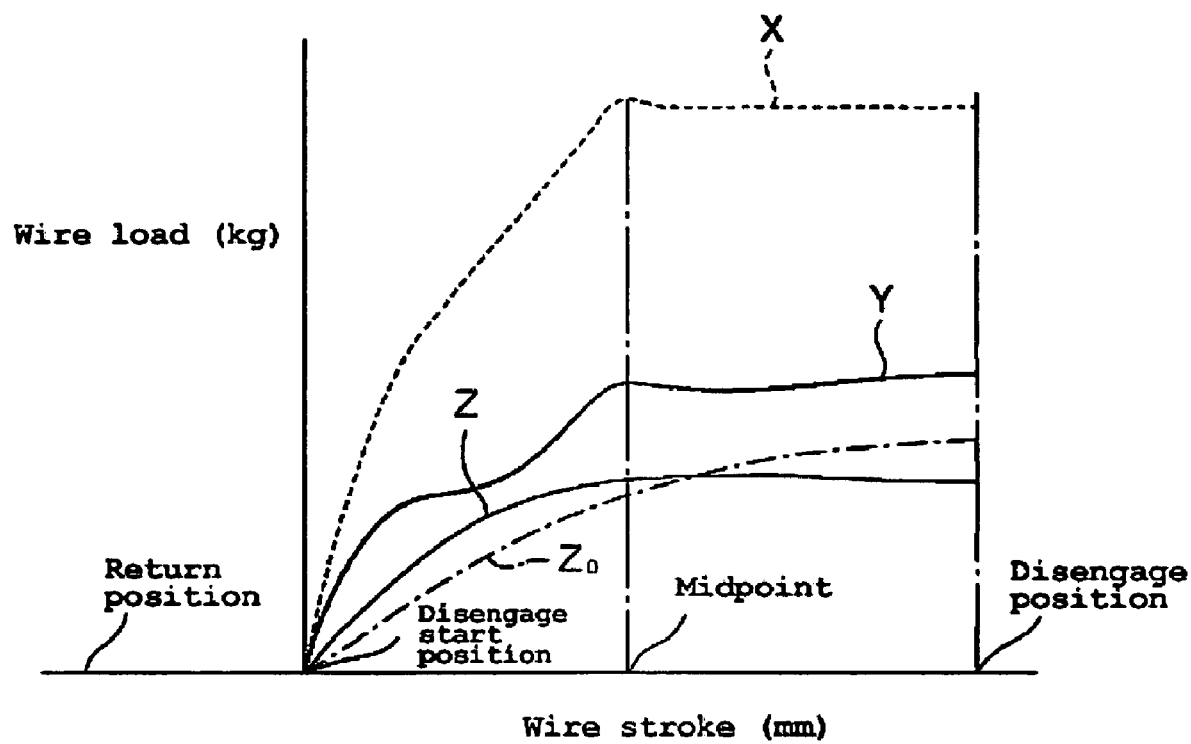
FIG. 34 is a graph showing the changes of the loads applied to a push lever and a clutch operating lever when the clutch operating lever is moved (e.g., squeezed), as a result of the clutch assist device of the second embodiment, so as to disengage the friction clutch.

FIG. 34 contrastively shows the variation characteristics of the urging force Z of the auxiliary spring 82 and the variation characteristics of the urging force $Z_0$ in a conventional device. The gradient at the rising section of the characteristic curve of the urging force Z in this assist mechanism 52 is greater than that in a conventional device.

Here, the conventional device is a device in which a rotatable member connected to a clutch release mechanism is directly connected to an auxiliary spring and in which the rotatable member and the auxiliary spring rotate at the same speed and the auxiliary spring can freely expand as the rotatable member rotates (for example, the device disclosed in the U.S. Pat. No. 5,495,928).

In this assist mechanism 52, the ratio of the angular velocity of the second rotatable member 58 to the angular velocity of the first rotatable member 57 is greater when the clutch lever 9 is in the disengage start position than when the clutch lever 9 is in the disengaged position. Also, the average of the angular velocity ratio at the time when the clutch lever 9 is moved from the disengage start position to the midpoint is greater than the average of the angular velocity ratio at the time when the clutch lever 9 is moved from the midpoint to the disengaged position. The angular velocity ratio may be gradually smaller while the clutch lever 9 is moved from the disconnect start position to the disengaged position. By properly adjusting the angular velocity ratio, the variation characteristics of the urging force Z of the auxiliary spring 82 transmitted to the first rotational member 57, that is, the variation characteristics of the assist force which the clutch lever 9 receives, can be advantageously set.

As described above, by properly setting the shape of the cam groove 71, the variation characteristics of the assist force can be freely adjusted. As shown in FIG. 34, the load X applied to the push lever 40 of the frictional clutch 18 varies greatly, immediately after the clutch lever 9 has passed the disengage start position, and the degree of change is smaller after that. With this assist mechanism 52, the gradient of the rising section of the characteristic curve of the urging force Z can be large so that the load Y applied to the clutch lever 9 can be changed with characteristics almost the same as those of the load X applied to the push lever 40 of the friction clutch 18 while the clutch lever 9 is moved from the disconnect start position to the midpoint. That is, the ratio between the load Y applied to the clutch lever 9 and the load X applied to the push lever 40 can be within a fixed range. It is, therefore, possible to reduce the load necessary to operate the clutch lever 9 and to provide the same operating feel as a conventional clutch lever at half-clutch operation.

As described in the description of the first embodiment, the assist force applied to the first rotatable member 57 is maintained within a fixed range when the clutch lever 9 is moved from the midpoint to the disengaged position. That is, the cam groove 71 is of such a shape as to maintain the urging force of the auxiliary spring 82 applied to the first rotatable member 57 via the link plate 72 within a fixed range when the clutch lever 9 is moved from the midpoint toward the disengaged position.

In this embodiment, the housing part 101 housing the canceling spring unit 100 is disposed at an upper front end of the case body 53 of the exterior case 51 as shown in FIG. 19. The housing part 101 is aligned with the first wire introduction port 95a in the transverse direction (in a direction perpendicular to the plane of FIG. 19). The internal structure of the canceling spring unit 100 is the same as that of the canceling spring unit 100 of the first embodiment.

Figure 23:
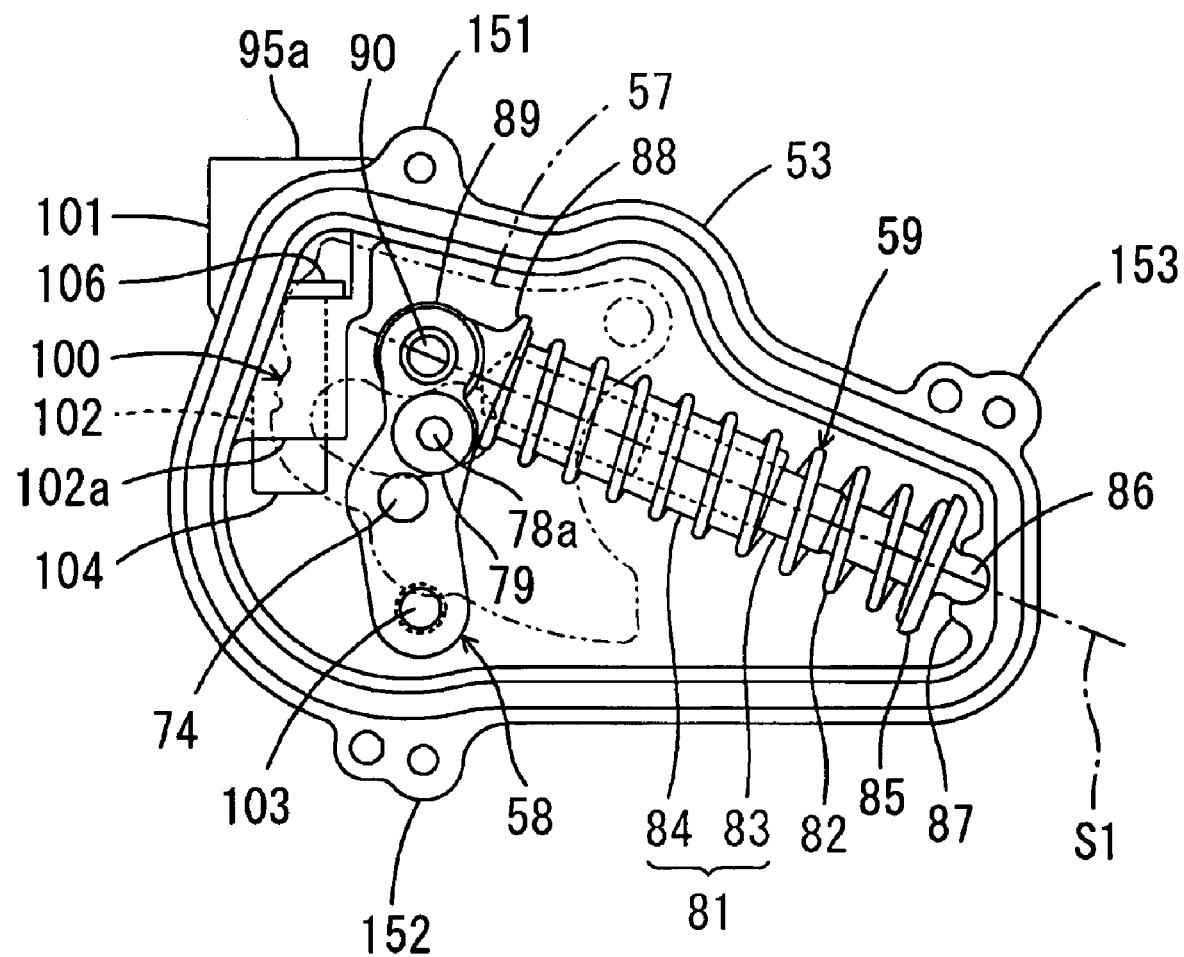
FIG. 23 is a side view of the clutch assist device of the second embodiment, illustrating the state of a part of the assist mechanism at the time when the clutch lever is in the disengaged position.

As shown in FIG. 23, the opening 102a of the cylinder 102 of the canceling spring unit 100 opens downward. The pressing pin 104 is elastically movable between a first position where its lower end largely protrudes from the opening 102a of the cylinder 102 and a second position where its lower end slightly protrudes from the opening 102a of the cylinder 102. When the pressing pin 104 is in the first position, the stopper 106 of the pressing pin 104 abuts against the upper end of the cylinder 102 to restrict the position of the pressing pin 104. When the pressing pin 104 is in the second position, the stopper 106 of the pressing pin 104 abuts against the spring receiver (not shown) to restrict the position of the pressing pin 104.

While the clutch lever 9 is moved from the return position (see FIG. 21) to the disengage start position (see FIG. 19), the pressing pin 104 abuts against the lock pin 103 of the link plate 72 from above. Thus, the link plate 72 receives the urging force of the canceling spring 105 (not shown in FIG. 21, but see FIG. 14) via the lock pin 103. As a result, when the clutch lever 9 is in the range of free play, the urging force of the auxiliary spring 82 applied to the link plate 72 is cancelled by the urging force of the canceling spring 105. Therefore, the force applied to the link plate 72 is substantially zero and the rotation of the link plate 72 in the clockwise direction caused by the auxiliary spring 82 (and thus the return of the clutch lever 9) is restricted.

When the clutch lever 9 gets close to the disengaged position over the disengage start position, the lock pin 103 of the link plate 72 is separated from the lower end of the pressing pin 104, as shown in FIG. 23. As a result, the pressing pin 104 is held in the first position by the urging force of the canceling spring 105, and the link plate 72 receives a force which urges it to rotate in the counterclockwise direction from the auxiliary spring 82.

As shown in FIG. 17, the case cover 54 of the exterior case 51 has a circular opening 110. The opening 110 is opposed to the wire connecting part 61 of the first rotatable member 57, and the engaging grooves 68a and 68b and the engaging holes 69a and 69b of the wire connecting part 61 are exposed to the outside of the exterior case 51 through the opening 110. In other words, fingers or a tool can be inserted through the opening 110 to engage the inner wires 44 into the engaging grooves 68a and 68b of the wire connecting part 61 or to engage the engaging elements 70a and 70b at the ends of the inner wires 44 into the engaging holes 69a and 69b. Therefore, the inner wires 44 can be connected to the first rotatable member 57 with the case cover 54 secured to the case body 53.

The case cover 54 has first and second support walls 111a and 111b extending from the edge of the opening 110 toward the center of the opening 110. The first support wall 111a and the second support wall 111b are located at opposite positions with respect to the center of the opening 110. Each of the first and second support walls 111a and 111b has a boss part 113 with a screw hole 112 at its end.

As shown in FIG. 16, the opening 110 is covered with a disk-like lid 114. The lid 114 is removably attached to the opening 110 and is secured to the support walls 111a, 111b by bolts 115. The bolts 115 are threaded into the screw holes 112 of the boss parts 113 of the support walls 111a, 111b.

As shown in FIG. 17, the wire connecting part 61 of the first rotatable member 57 has a hexagonal insertion hole 118. The insertion hole 118 is located in the area of the opening 110. Therefore, when a tool such as a hexagonal wrench is inserted from the opening 110 into the insertion hole 118, the position of the first rotatably member 57 can be adjusted. The wire connecting part 61 of the first rotatable member 57 has a positioning recess 119a. The second support wall 111b of the case cover 54 has a positioning projection 119b. The projection 119b and the recess 119a align with each other when the clutch lever 9 is in the proper disengage start position. Therefore, by adjusting the amount of free play of the clutch lever 9 so that the projection 119a and the recess 119b can align with each other, the disengage start position can be easily set.

The method of attaching the clutch assist device 50 to the frame 2 of the motorcycle 1 and an example of the mounting structure thereof are next described. The clutch assist device 50 described below is the same as the clutch assist device 50 described above except that the position of the third fastening part 153 is changed from on an upper part of the case body 53 to on a lower part of the case body 53 (see FIG. 26). The other construction is the same as that as described above.

Figure 32:
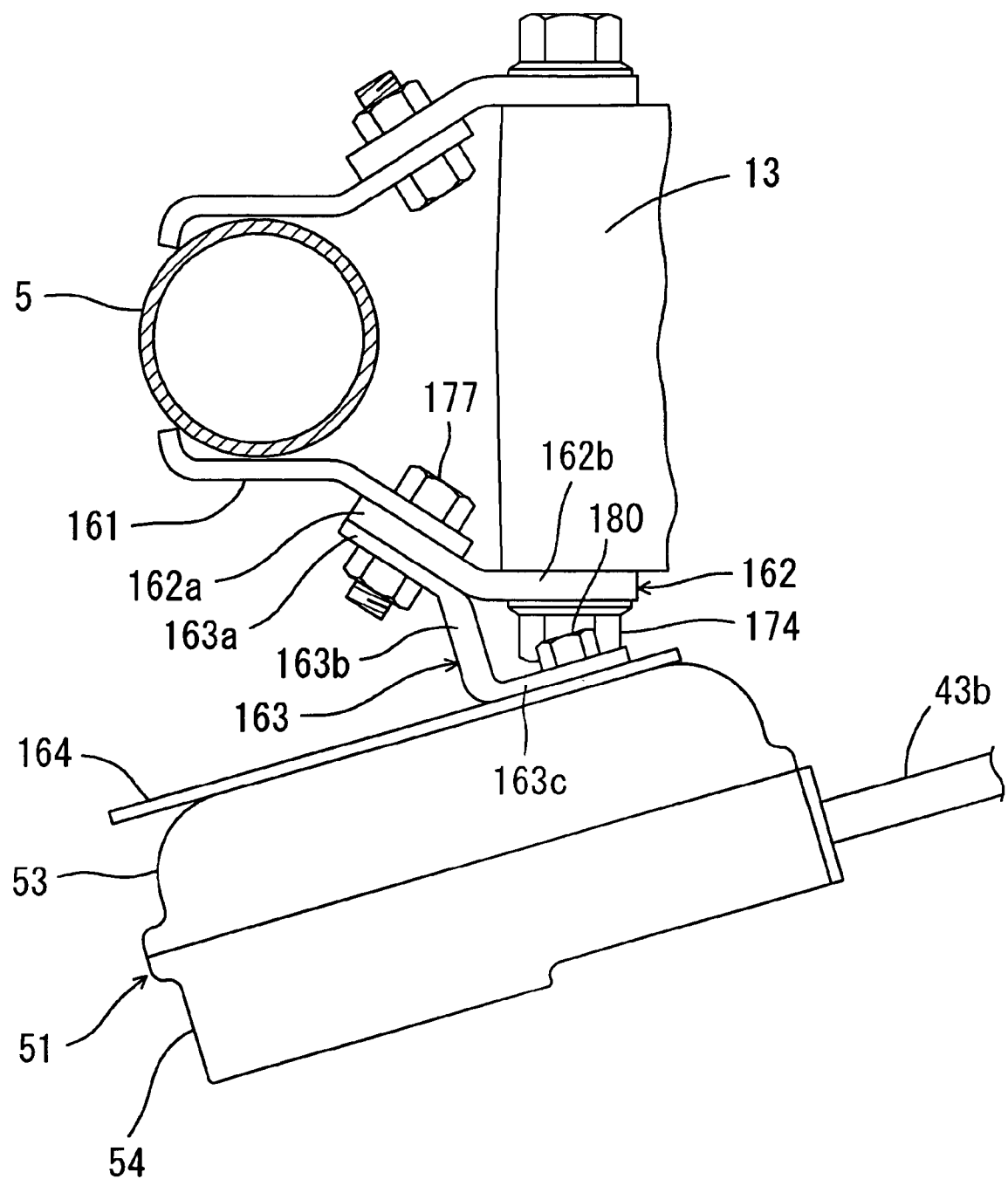
FIG. 32 is a top plan view illustrating the installation state of the operating assisting device of FIG. 31.

As shown in FIG. 32, the clutch assist device 50 preferably is attached to the down tube 5 of the frame 2 via a first bracket 161, a second bracket 162, a third bracket 163 and a mounting plate 164. Of course, other locations of the clutch assist device 50 on the vehicle are also possible, depending upon the type of vehicle and application.

Figure 27:
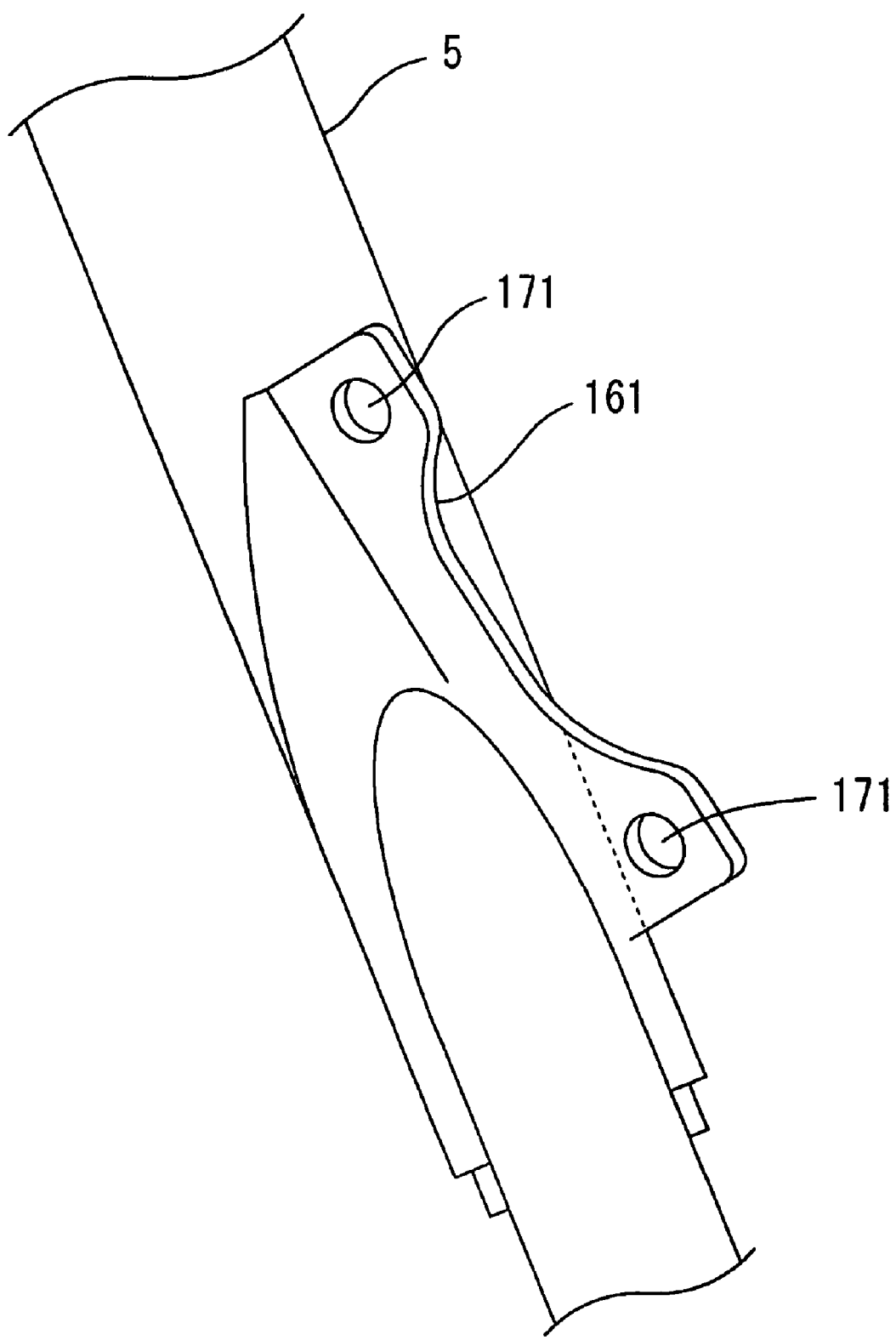
FIG. 27 is a side view illustrating the installation state of a first bracket.

As shown in FIG. 27, in the illustrated embodiment, the first bracket 161 is secured to the down tube 5. The method for securing the first bracket 161 is not specifically limited. Here, the first bracket 161 is joined to the down tube 5 by welding. The first bracket 161 is, as in the case with the second bracket 162, originally attached to the down tube 5 to support a part of the engine 13. That is, the clutch assist device 50 is attached using the existing brackets 161 and 162. The first bracket 161 extends along the longitudinal direction of the down tube 5. The first bracket 161 has bolt holes 171 at its longitudinal ends.

Figure 28:
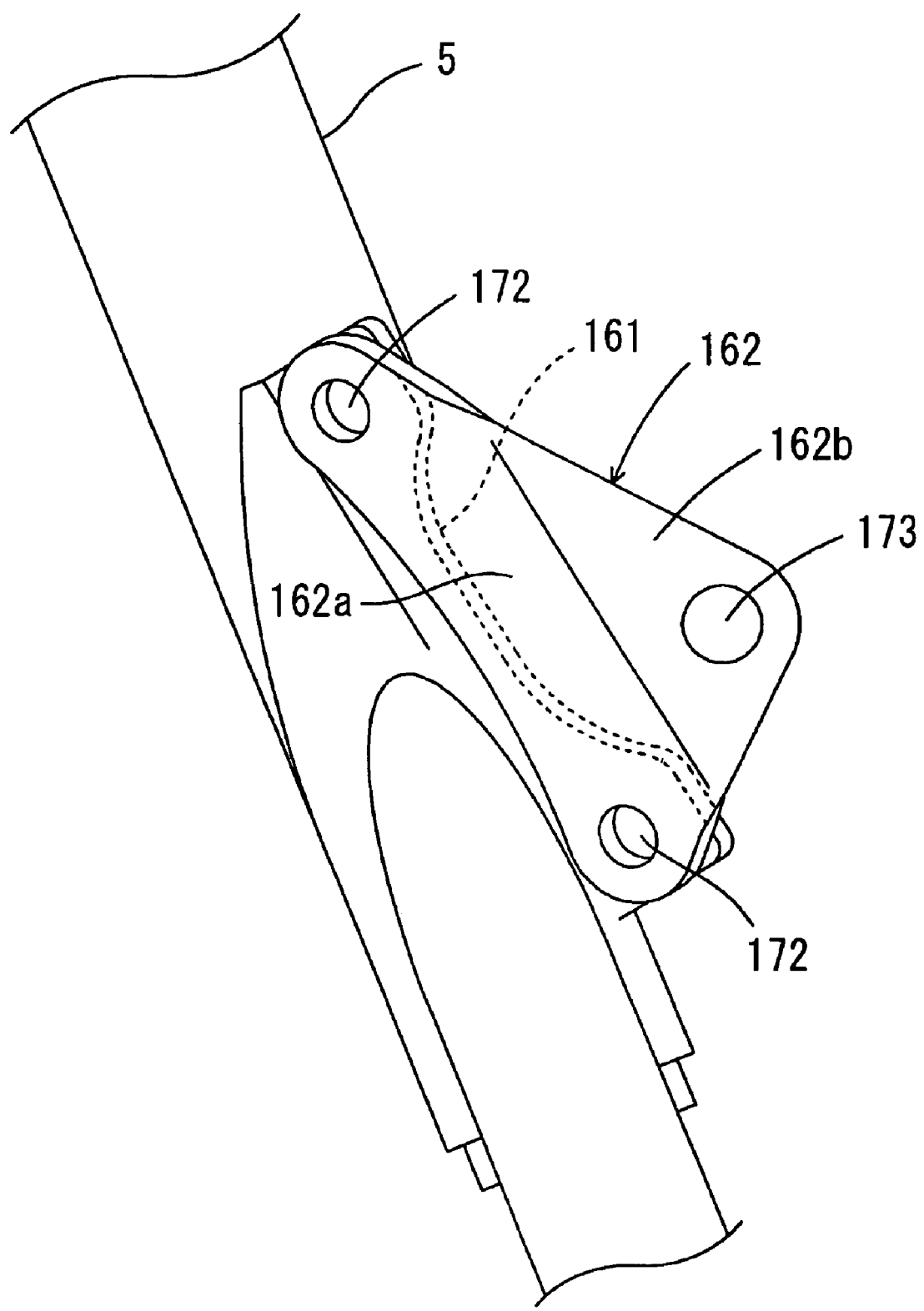
FIG. 28 is a side view illustrating the installation state of a second bracket.

As shown in FIG. 28, the second bracket 162 is laid on the front side of the first bracket 161. The second bracket 162 is a bent plate member with a generally triangle shape as viewed from a side. The second bracket 162 has a front half part 162a, which extends in a direction inclined from the longitudinal direction of the vehicle along the first bracket 161, and a rear half part 162b, which is located behind the front half part 162a and is bent inward (see FIG. 32). The front half part 162a of the second bracket 162 has bolt holes 172 at positions corresponding to the bolt holes 171 of the first bracket 161. The rear half part of the second bracket 162 also has a bolt hole 173. As shown in FIG. 32, a bolt 174 for fixing a part of the engine 13 is fitted into the bolt hole 173. The part of the engine 13 is supported by the down tube 5 via the first bracket 161 and the second bracket 162.

Figure 29:
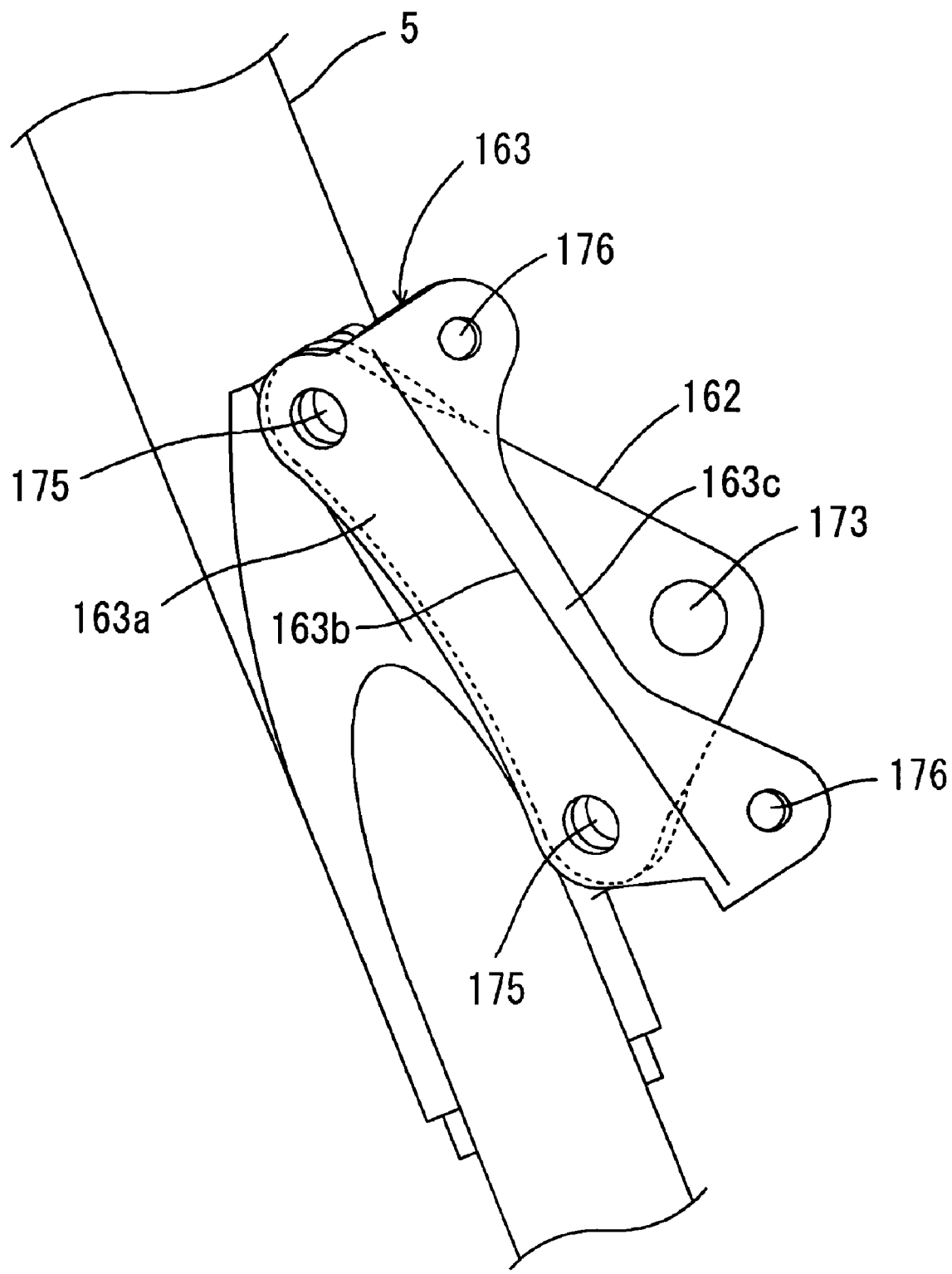
FIG. 29 is a side view illustrating the installation state of a third bracket.

As shown in FIG. 29, the third bracket 163 is laid on the front side of the second bracket 162. The third bracket 163 is a bent plate configured into a three sections from front to rear, and has a front part 163a extending along the front half part 162a of the second bracket 162, an intermediate part 162b extending outward from the front part 163a, and a rear part 163c extending inward from the intermediate part 162b (see FIG. 32). The front part 163a has bolt holes 175 at positions corresponding to the bolt holes 172 of the front half part 162a of the second bracket 162. The rear part 163c also has bolt holes 176 at its upper and lower end.

As shown in FIG. 32, bolts 177 are inserted through the bolt holes 171 of the first bracket 161, the bolt holes 172 of the second bracket 162 and the bolt holes 175 of the third bracket 163. The second bracket 162 and the third bracket 163 are secured together with the first bracket 161.

Figure 30:
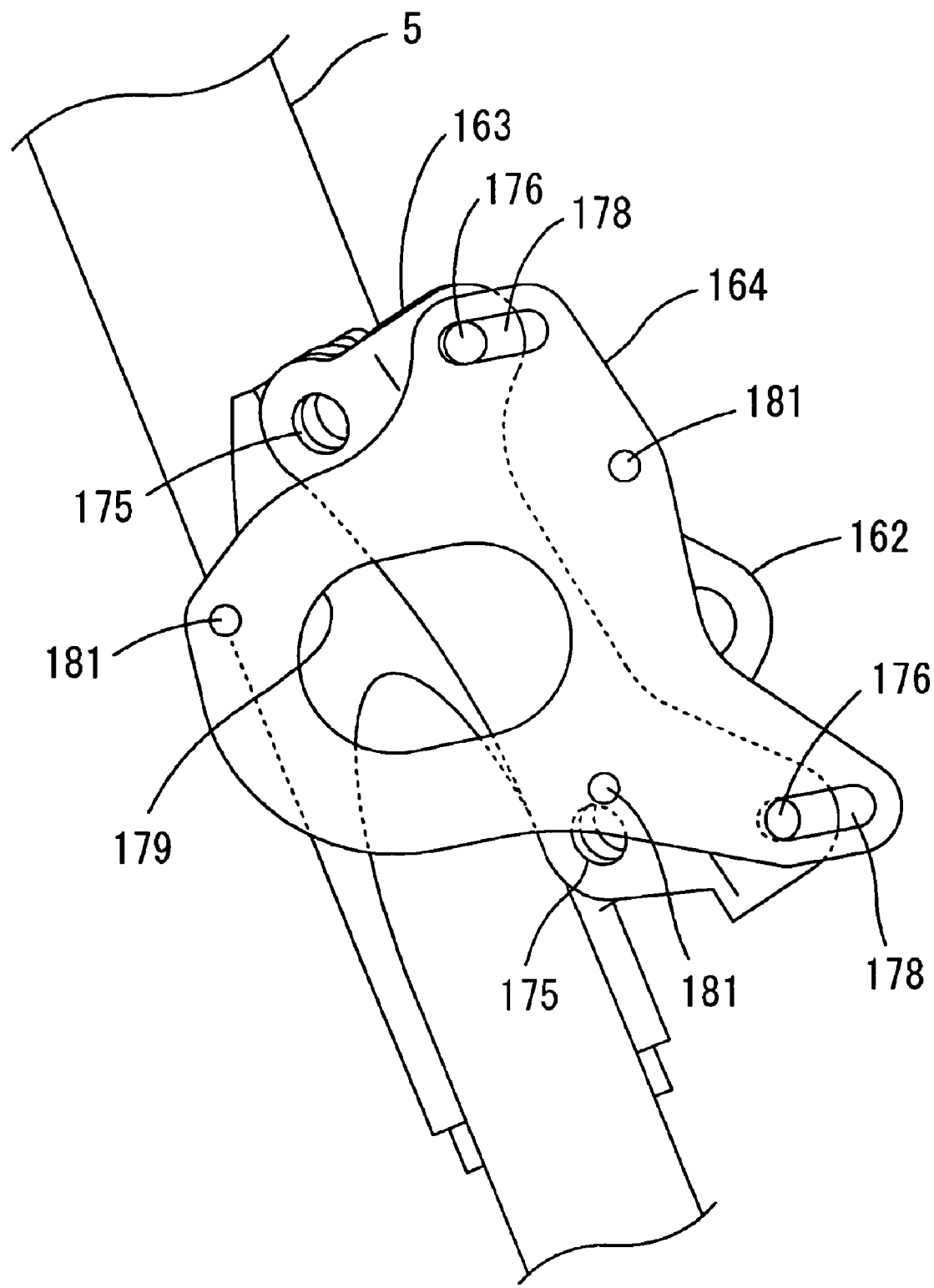
FIG. 30 is a side view illustrating the installation state of a mounting plate.

As shown in FIG. 30, the mounting plate 164 is laid on the front side of the rear part 163c of the third bracket 163. The mounting plate 164 is in the form of a flat plate (see FIG. 32). The mounting plate 164 has slots 178 preferably extending in the longitudinal direction at its upper and lower rear ends. The mounting plate 164 has a hole 179 having an oval shape at its center. The mounting plate 164 also has three bolt holes 181 through which bolts (not shown) for attaching the case body 53 of the clutch assist device 50 can be inserted.

Bolts 180 (see FIG. 32) are inserted through the bolt holes 176 of the third bracket 163 and the slots 178 of the mounting plate 164. The bolts 180 can be fixed at arbitrary positions in the slots 178. Therefore, by sliding the mounting plate 164 back or forth with the bolts 180 inserted through the slots 178, the longitudinal position of the mounting plate 164 with respect to the third bracket 163 can be finely adjusted with ease.

Figure 26:
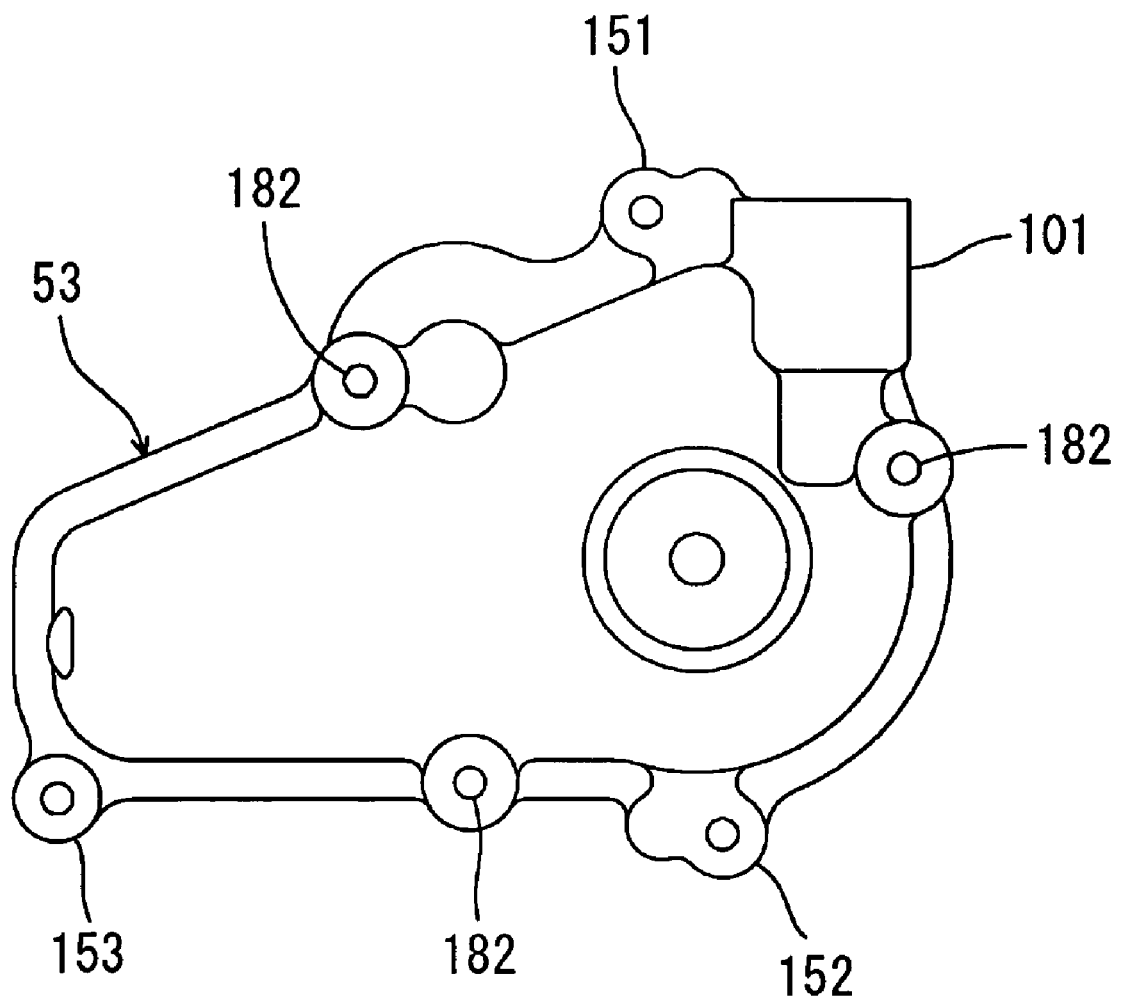
FIG. 26 is a reverse side view of a housing body of the second embodiment.

As shown in FIG. 26, three bolt holes 182 corresponding to the bolt holes 181 of the mounting plate 164 are formed in the reverse side of the case body 53 of the clutch assist device 50. The case body 53 is so positioned that the bolt holes 182 overlap the bolt holes 181 of the mounting plate 164 and are placed on the front side of the mounting plate 164 (see FIG. 32). Then, bolts (not shown) are threaded into the bolt holes 181 of the mounting plate 164 and the bolt holes 182 of the case body 53 to secure the case body 53 to the mounting plate 164. As described before, since the longitudinal position of the mounting plate 164 can be finely adjusted with ease, the longitudinal position of the case body 53 secured to the mounting plate 164 can be finely adjusted with ease. Therefore, the position of the case body 53 can be adjusted so that the case body 53 can be positioned in a desired position if needed after the case body 53 has been attached to the amounting plate 164.

After the mounting plate 164 has been attached to the case body 53, the case cover 54 is placed on the case body 53 and bolts are threaded into the bolt holes of the first, second and third fastening parts 151, 152 and 153 to secure the case cover 54 to the case body 53. Then, the first clutch wire 43a and the second clutch wire 43b are attached to the first rotatable member 57 through the opening 110 of the case cover 54.

Figure 31:
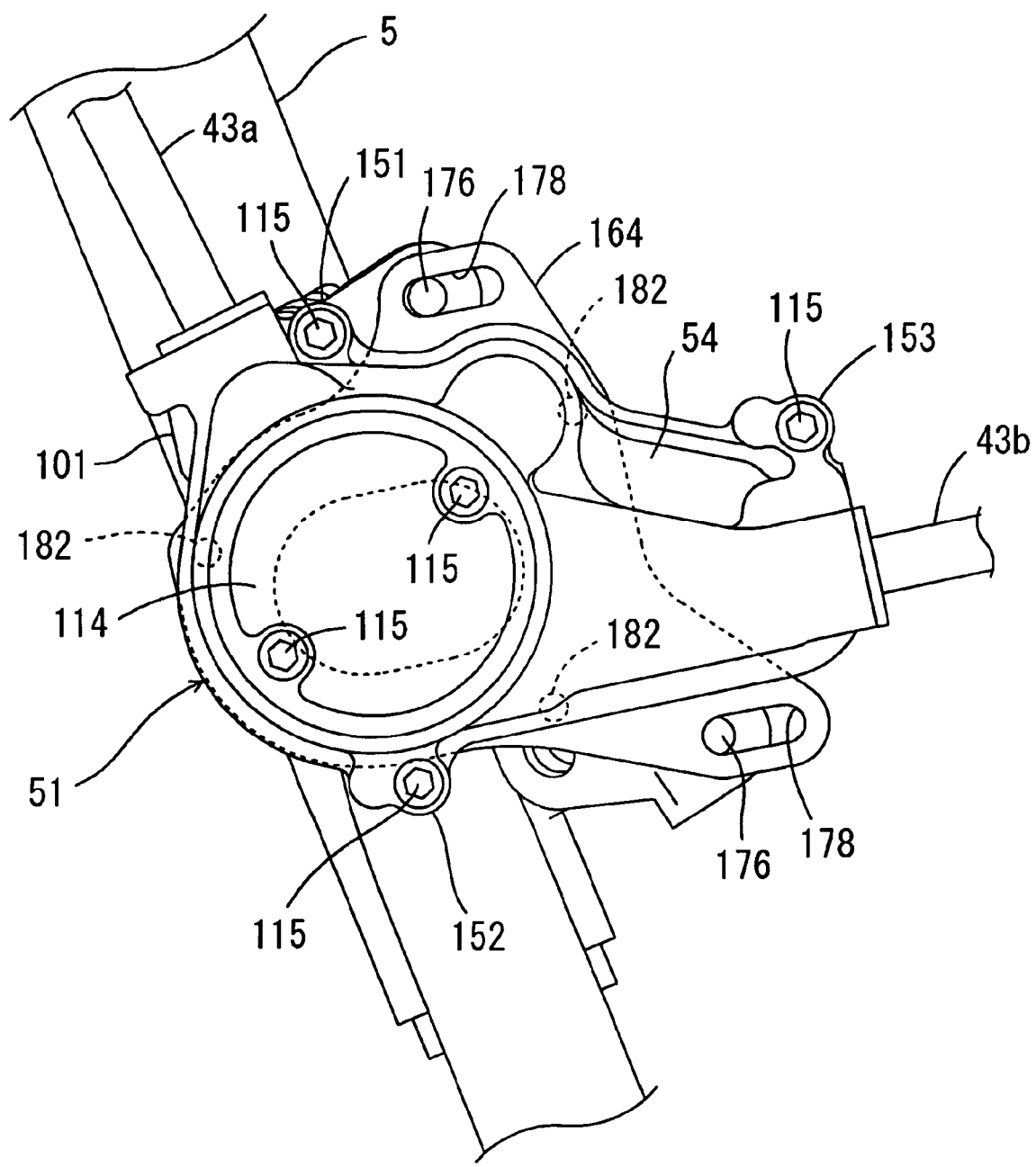
FIG. 31 is a side view illustrating the installation state of the operating assisting device as attached to the vehicle frame by the first, second and third brackets shown in FIGS. 27-30.
Figure 33:
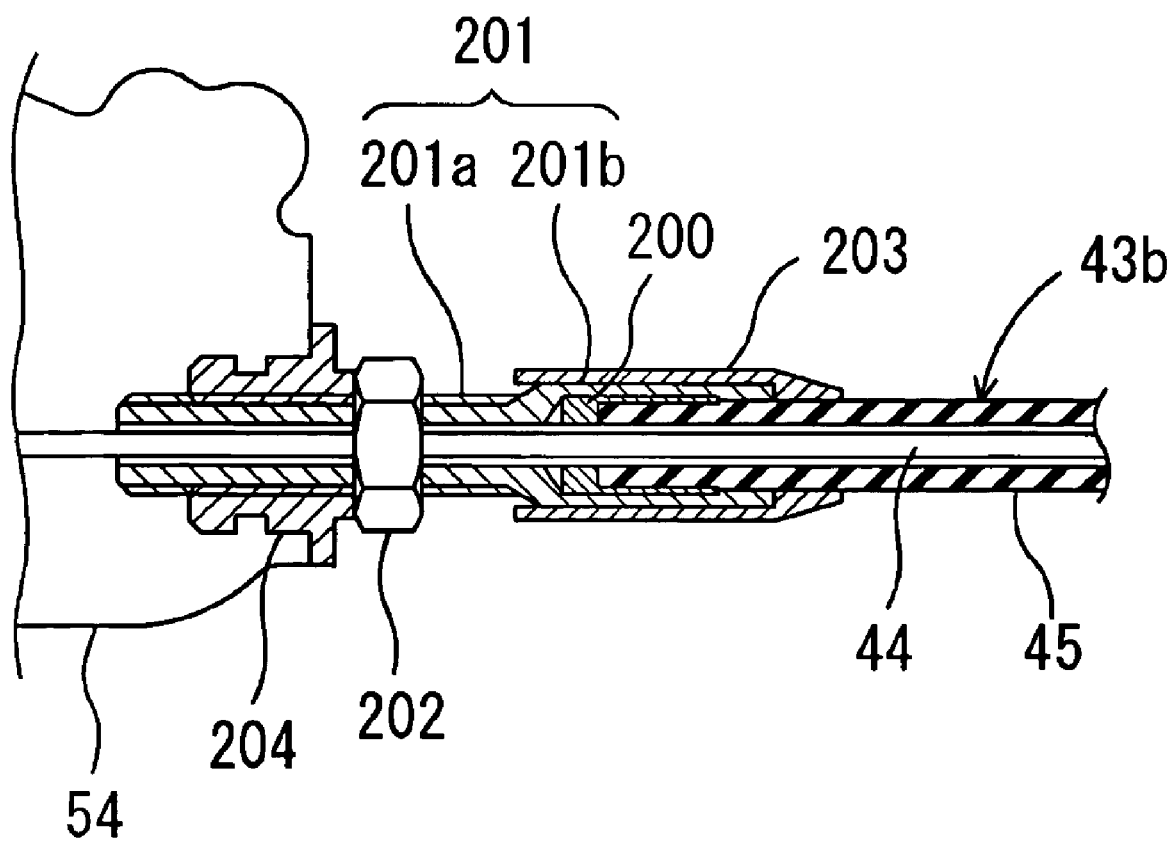
FIG. 33 is a cross-sectional view illustrating the structure of a connection between the clutch assist device and a portion of the clutch wire.

As shown in FIG. 33, an engaging element 200 with a cylindrical shape (which is not shown in FIG. 31 and so on) is secured to an end of the outer tube 45 of the second clutch wire 43b. The engaging element 200 may be bonded to the outer tube 45 or press-fitted over the outer tube 45. A block 204 with a screw hole is fixed in a wire introduction port of the case cover 54. A screw 201 extending in the longitudinal direction (lateral direction of FIG. 33) is threaded into the screw hole of the block 204.

The screw 201 has a threaded part 201a and a large diameter part 201b formed on the rear side of the threaded part 201a. The engaging element 200 is rotatably inserted in the large diameter part 201b. The large diameter part 201b has a step at its distal end so that the rear end of the engaging element 200 can be captured on the step and prevented from coming off from the large diameter part 201b. Therefore, when the screw 201 is moved back or forth by rotating it, the outer tube 45 moves back or forth together with the screw 201.

The screw 201 and the engaging element 200 have through holes through which the inner tube 44 can extend. The inner tube 44 of the second clutch wire 43b extends through the through holes of the engaging element 200 and the screw 201 and is connected to the first rotatable member 57. A cap 203 is attached over the outer periphery of the large diameter part 201b of the screw 201. The reference numeral 202 designates a nut for fixing the position of the screw 201.

The screw 201 is used to adjust the installation positions of the second clutch wire 43b and the clutch assist device 50. That is, after the outer tube 45 of the second clutch wire 43b has been attached at a predetermined position on the friction clutch 18 side, the bolts 180 are inserted into the bolt holes 176 of the third bracket 163 and the slots 178 of the mounting plate 164 and fastened to the extent that the clutch assist device 50 can be slid back and forth, as described before. Then, the length of the outer tube 45 of the second clutch wire 43b is so adjusted, by rotating the screw 201, that the positioning recess 119a of the first rotatable member 57 and the projection 119b of the case cover 54 align with each other. When the recess 119a and the projection 119b align with each other, the nut 202 is tightened to fix the position of the screw 201. The outer tube 45 of the second clutch wire 43b can be thereby set to an appropriate length. After that, the bolts 180 are tightened to fix the mounting plate 164 firmly. Then, the lid 114 is placed over the opening 110 of the case cover 54 and is secured to the support walls 111a, 111b of the case cover 54 by the bolts 115.

As described above, the direction in which the first clutch wire 43a extends to the assist mechanism 52 is different from the direction in which the second clutch wire 43b extends from the assist mechanism 52. That is, the assist mechanism 52 is located where the direction of the clutch wire 43 is changed. Therefore, the degree of curvature of the clutch wire 43 can be small, and effects similar to those of the first embodiment (e.g., reduced cable friction when actuated) can be achieved.

In addition, since the assist mechanism 52 is installed at an intermediate point of the clutch wire 43, when the assist mechanism 52 is located properly, the degree of freedom in installing the clutch wire 43 can be improved. Also, the assist mechanism 52 can be located relatively freely without curving the clutch wire 43 excessively. Therefore, the clutch assist device 50 is easy to be mounted on a vehicle.

Also, since the ratio between the displacements of the first clutch wire 43a and the second clutch wire 43b is constant, the free play of the clutch lever 9 is not largely changed even if a change in temperature causes thermal expansion of the clutch wires 43a and 43b. Therefore, the operability of the clutch level 9 is maintained.

According to this embodiment, the cam mechanism (that is, the cam groove 71 and the cam follower 79), which is interposed between the first rotatable member 57 and the second rotatable member 58, is located between the first engaging hole 69a and the second engaging hole 69b of the first rotatable member 57. Therefore, the first rotatable member 57 can be small in size and, thus, the entire clutch assist device 50 can be small in size.

Also, according to this embodiment, the second rotatable member 58 is disposed on the reverse side of the first rotatable member 57 and is located on only one side of the first rotatable member 57 in the axial direction of the pivot shaft 63. Therefore, since the thickness of the second rotatable member 58 in the axial direction can be small, the thickness of the clutch assist device 50 can be small.

In this embodiment, the auxiliary spring 82 is located in such a position as to overlap at least one of the first rotatable member 57, the inner wire 44 of the first clutch wire 43a and the inner wire 44 of the second clutch wire 43b when viewed in a direction parallel to the axial direction of the pivot shaft 63. This arrangement also contributes to a compact construction for the clutch assist device 50.

Also in this embodiment, the pivot shaft 63 and the engaging holes 69a and 69b are located in the vicinity of the peripheral edge of the exterior case 51. The distance between the pivot shaft 63 and the peripheral edge of the exterior case 51 is smaller than that between the pivot shaft 63 and the engaging hole 69a and is smaller than that between the pivot shaft 63 and the engaging hole 69b. Since the pivot shaft 63 and the engaging holes 69a and 69b are located in the vicinity of the peripheral edge of the exterior case 51, as described above, the clutch assist device 50 can be small in size.

Also in this embodiment, the second rotatable member 58 and the auxiliary spring 82 are located in such a manner that a plane in which the second rotatable member 58 rotates and a line extending in the direction in which the auxiliary spring 82 can be elastically deformed (a phantom line extending in the longitudinal direction of the spring holder 81) preferably lie parallel to each other. The pin 90 for transmitting the assist force of the auxiliary spring 82 is positioned between the second rotatable member 58 and the auxiliary spring 82 and extends parallel to the pivot shaft 63. This configuration also allows the clutch assist device 50 to be smaller in size.

Also in this embodiment, the angle, which the first clutch wire 43a and the second clutch wire 43b make between each other, with the assist mechanism 52 interposed therebetween, preferably is between 90 and 120°. When the angle is equal to or smaller than 120°, the above-stated advantages of using the clutch assist device 50 to produce the directional change is notable. The angle of course may be greater than 120° though.

As described before, the clutch assist device 50 is attached to the down tube 5 via the mounting plate 164. The mounting plate 164 has slots 178 for use in adjusting the installation position of the clutch assist device 50. Therefore, since the installation position of the clutch assist device 50 can be adjusted with ease, the clutch assist device 50 is easy to install.

The case cover 54 of the clutch assist device 50 has an opening 110, and adjustment of the amount of free play of the clutch lever 9 and attachment of the clutch wires 43a, 43b to the assist mechanism 52 can be made with ease.

Also in this embodiment, a cam mechanism, having the cam groove 71 and the cam follower 79, is interposed between the first rotatable member 57 and the second rotatable member 58. Therefore, by properly determining the curve of the cam groove 71, the relation between the pendulum-like oscillation of the spring unit 59 and the rotation of the first rotatable member 57 can be freely set and desired operability can be achieved.

When the clutch lever 9 is moved from the disengage start position to the midpoint, the increasing rate of the urging force of the auxiliary spring 82 applied to the first rotatable member 57 can be high in the initial stage immediately after the disengage start position and then reduced. Therefore, since the assist force can be significantly large in the initial stage of the half-clutch operation, the operability can be improved.

Also, when the clutch lever 9 is moved from the disengage start position to the midpoint, the ratio between the load of the clutch spring 27 applied to the push lever 40 of the clutch release mechanism 28 and the actual load applied to the clutch lever 9 can be maintained within a fixed range. Therefore, the load applied to the clutch lever 9 when the clutch lever 9 is operated is smaller than the load applied to the push lever 40 and varies with a tendency similar to that of the load from the clutch spring 27. Therefore, the load in operating the clutch lever 9 can be reduced and natural and comfortable operating feel can be provided.

The spring unit 59 having the auxiliary spring 82 can oscillate about the pivot end 86 in a pendulum-like manner. Thus, since the direction in which the urging force of the spring 82 acts can be freely changed, the urging force can be applied in the appropriate direction. Therefore, although a cam mechanism is interposed between the spring unit 59 and the first rotatable member 57, the loss of the urging force of the auxiliary spring 82 applied to the first rotatable member 57 can be reduced. In addition, the wear of the assist mechanism 52 can be reduced, and the service life and reliability of the clutch assist device 50 can be improved.

The present invention is not limited to the embodiments described above, and various modifications can be made to the present invention without departing from the scope thereof.

For example, the operating element for operating the frictional clutch is not limited to a clutch lever to be operated by a hand and may be a clutch pedal to be operated by a foot.

In the embodiments described above, the first and second clutch wires 43a, 43b (more specifically, the inner wires 44 thereof) physically separated from each other. However, the first linear member and the second linear member are not necessarily separated from each other as long as they can be connected to the rotatable member 57. The first linear member and the second linear member may be joined together. That is, one side portion and other side portion of one linear member connected to the first rotatable member 57 may be regarded as the first linear member and the second linear member, respectively. In this case, although the first joint and the second joint may be located in different locations, the linear member may be connected to the first rotatable member 57 at one point so that the first and second joints can be located at the same position.

Additionally, as noted above, the auxiliary force member for applying an urging force to the first rotatable member 57 is not limited to the spring unit 59 having the auxiliary spring 82. Moreover, the auxiliary spring 82 is not limited to a compression spring which can apply an urging force in the direction in which it expands and may be a tension spring or a torsion spring which can apply an urging force in the direction in which it contracts. The canceling elastic member for applying a canceling force to cancel the urging force of the auxiliary spring 82 when the clutch lever 9 is between the return position and the disengage start position is not limited to the canceling spring unit 100 having the canceling spring 105. A different type of elastic member, such as an air spring, may be used for the auxiliary elastic member or the canceling elastic member.

In the embodiments described above, the movable member which moves in synchronization with the clutch lever 9 is the rotatable member 57 rotatable about a specific rotating shaft (pivot shaft 63). Therefore, the clutch assist device 50 can be simplified in structure and have high ruggedness. The movable member which moves in synchronization with the clutch lever 9 is not limited to such a rotatable member, though. For example, the movable member may be a slidable member that can be reciprocated along a direction (linearly or in a curve) or the like. When the movable member is a member which can be reciprocated along a direction, the traveling speed of the movable member can be specified as, for example, a velocity in the direction. Therefore, the velocity ratio, which is the ratio of the traveling velocity of the rotatable member to the traveling velocity of the movable member, can be specified, for example, as the ratio between the velocity of the movable member in the above direction and the angular velocity of the rotatable member.

The component for generating the assist force in the assist mechanism 52 is not limited to an elastic member such as the auxiliary spring 82 and may be a motor or the like.

The positioning mechanism for use in adjusting the installation position of the clutch assist device 50 is not limited to the slots 178 formed through the mounting plates 164 and may be a different mechanism. In the embodiments described above, the mounting plate 164 has the slots 178 and the clutch assist device 50 is positioned by adjusting the position of the mounting plate 164. However, the case body 53 of the clutch assist device 50 may have the slots 178 so that the case body 53 is slidable with respect to the mounting plate 164. The fasteners are not limited to the bolts 180 and may be screws or the like.

In addition, the friction clutch is not limited to a multi-plate wet clutch and may be a single-plate dry clutch. In addition, the clutch release mechanism is not limited to rack-and-pinion type. The present invention can be implemented when the clutch release mechanism is ball screw type or cam type.

Figure 35:
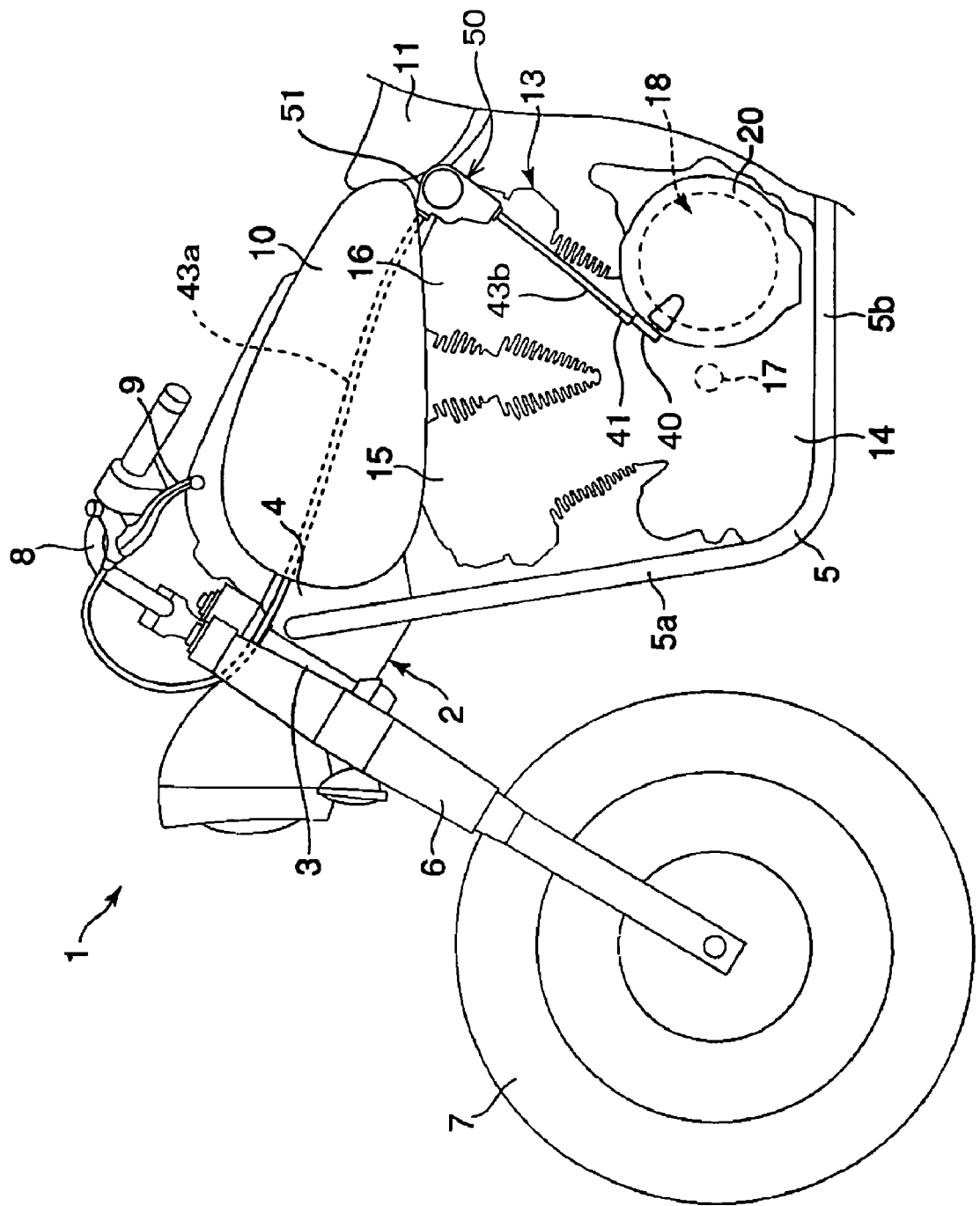
FIG. 35 is a side view of a motorcycle showing another possible position for locating the clutch assist device on the motorcycle.

In the embodiments described above, the clutch assist device 50 is supported by the down tube 5 of the frame 2. However, the installation position of the clutch assist device 50 is not specifically limited. For example, the clutch assist device 50 may be located below the fuel tank 10 or the seat 11 with the first clutch wire 43a extending in the longitudinal direction as shown in FIG. 35.

Although not shown, the clutch assist device 50 may be located in the vicinity of the friction clutch 18. The exterior case 51 of the clutch assist device 50 may be attached to the clutch cover 20.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A clutch assist device operating between a clutch and a clutch operator, the clutch and clutch operator being connected by a transmitter having first and second linear members, the clutch including a clutch element being biased by a clutch spring toward an engaged position and being movable by the clutch operator and the transmitter from the engaged position to a disengaged position, the clutch assist device operating between the first and second linear members and comprising:

a rotatable member being connected to the first and second linear members and being rotatable about a rotational axis; and an auxiliary force member which disposed relative to the rotatable member, at least when the clutch operator is moved to disengage the clutch element, to apply an assist force to the rotatable member in such a direction as to assist disengaging the clutch element while the clutch operator is moved from a disengage start position, at which point the clutch operator works against the bias of the clutch spring, to a disengaged position where the clutch element is in the disengaged position.

2. The clutch assist device of claim 1, wherein the auxiliary force member is located in such a position as to overlap at least one of the rotatable member, the first linear member and the second linear member when viewed in a direction parallel to the rotational axis.

3. The clutch assist device of claim 1 additionally comprising a case for housing the rotatable member and the auxiliary force member, wherein the rotatable member has a first connecting part connected to the first linear member and a second connecting part connected to the second linear member, and the rotational axis and at least one of the first and second connecting parts are disposed in the vicinity of a peripheral edge of the case.

4. The clutch assist device of claim 1 additionally comprising a case for housing the rotatable member and the auxiliary force member, wherein the rotatable member has a first connecting part connected to the first linear member and a second connecting part connected to the second linear member, and the distance between the rotational axis and a peripheral edge of the case is smaller than the distance between the rotational axis and the first connecting part and the distance between the rotational axis and the second connecting part.

5. The clutch assist device of claim 1, wherein the rotatable member is generally rotatable in a plane, the auxiliary force member comprises an elastic member that deform in a direction generally parallel to the plane, and the clutch assist device further includes a columnar member that extends parallel to the rotational axis, the columnar member is disposed between the rotatable member and the auxiliary force member and is arranged to transmit the assist force of the elastic member to the rotatable member.

6. The clutch assist device of claim 1 additionally comprising an auxiliary rotatable member for receiving the assist force from the auxiliary force member, the rotatable member having a first connecting part connected to the first linear member and a second connecting part connected to the second linear member, and an assist force transmitting component interposed between the rotatable member and the auxiliary rotatable member for transmitting the assist force, which the auxiliary rotatable member receives, to the rotatable member, wherein the assist force transmitting component is disposed between the first connecting part and second connecting part of the rotatable member.

7. The clutch assist device of claim 1 additionally comprising an auxiliary rotatable member for receiving the assist force from the auxiliary force member, the rotatable member having a first connecting part connected to the first linear member and a second connecting part connected to the second linear member, and a cam mechanism interposed between the rotatable member and the auxiliary rotatable member for transmitting the assist force, which the auxiliary rotatable member receives, to the rotatable member, the cam mechanism being disposed between the first connecting part and second connecting part of the rotatable member.

8. The clutch assist device of claim 1, wherein the rotatable member is generally in the form of a sector with a central angle smaller than 120° when viewed in the direction of the rotational axis.

9. The clutch assist device of claim 1, wherein the rotatable member has a first connecting part connected to the first linear member and a second connecting part connected to the second linear member, and wherein there are further provided an auxiliary rotatable member disposed on only one side of the rotatable member for receiving the assist force of the auxiliary force member, and an assist force transmitting component interposed between the rotatable member and the auxiliary rotatable member for transmitting the assist force, which the auxiliary rotatable member, receives to the rotatable member.

10. The clutch assist device of claim 1, wherein the direction in which the first linear member extends from the rotatable member is different than the direction in which the second linear member extends from the rotatable member.

11. The clutch assist device of claim 1, wherein:

the first linear member is a first clutch wire having an inner wire, which connects together the clutch operator and the rotatable member, and an outer sheath through which the inner wire slides, the second linear member is a second clutch wire having an inner wire, which connects together the clutch and the rotatable member, and an outer sheath through which the inner wire slides, and wherein the angle formed between the first clutch wire and the second clutch wire, as the wires extend from the rotatable member, is not larger than 120°.

12. The clutch assist device of claim 1 additionally comprising a case for housing the rotatable member and the auxiliary force member; and an mounting assembly configured to be interposed between a vehicle frame and the case for attaching the case to the vehicle frame, the mounting assembly having a positioning mechanism for adjusting the installation position of the case on the vehicle frame.

13. The clutch assist device of claim 12, wherein the mounting assembly has a first mounting part secured to the vehicle frame and a second mounting part for supporting the case, and one of the first and second mounting parts has a slot and the other mounting part is secured by a fastener slidably inserted through the slot.

14. The clutch assist device of claim 1, wherein the first linear member is a first clutch wire having an inner wire, which connects together the clutch operator and the rotatable member, and an outer sheath through which the inner wire slides, wherein the second linear member is a second clutch wire having an inner wire, which connects together the clutch and the rotatable member, and an outer sheath through which the inner wire slides, each of the inner wires of the first and second clutch wires having an engaging part, wherein the rotatable member has an engaging part removably engageable with the engaging parts of the inner wires of the first and second clutch wires, and wherein the clutch assist device further comprises a case including a case body for housing the auxiliary force member and the rotatable member, the case body having an opening at a position corresponding to the engaging parts of the inner wires and the engaging part of the rotatable member within the case and a lid for covering the opening.

15. The clutch assist device of claim 1, wherein the auxiliary force member pivots relative to the rotatable member.

16. The clutch assist device of claim 1, wherein the auxiliary force member comprises an elastic component.

17. The clutch assist device of claim 16, wherein the elastic component is a compression spring.

18. The clutch assist device of claim 1, wherein the auxiliary force member increases in length as the rotatable member moves from the disengage start position to the disengaged position.

19. The clutch assist device of claim 1 in combination with a vehicle equipped with the clutch, the transmitter, and the clutch operator.

20. The combination of claim 19, wherein the second linear member extends linearly from the rotatable member to the clutch.

21. The combination of claim 19, wherein the vehicle further comprises a vehicle frame having a down tube for supporting an engine, and the first linear member extends from the rotatable member to the clutch operator along the down tube.

* * * * *